(12) United States Patent
Kim et al.

(10) Patent No.: US 8,713,463 B2
(45) Date of Patent: Apr. 29, 2014

(54) MOBILE TERMINAL AND CONTROLLING METHOD THEREOF

(75) Inventors: Changmok Kim, Seoul (KR); Nayoung Hong, Seoul (KR); Minjoo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 521 days.

(21) Appl. No.: 13/048,785

(22) Filed: Mar. 15, 2011

(65) Prior Publication Data

US 2012/0011438 A1 Jan. 12, 2012

(30) Foreign Application Priority Data

Jul. 12, 2010 (KR) ........................ 10-2010-0066784

(51) Int. Cl.
*G06F 3/00* (2006.01)

(52) U.S. Cl.
USPC ............ 715/768; 715/810; 715/821; 715/859

(58) Field of Classification Search
USPC .................. 715/768, 810, 821, 859
See application file for complete search history.

(56) References Cited

U.S. PATENT DOCUMENTS

| 5,757,368 | A  | * | 5/1998  | Gerpheide et al. | 715/769 |
|-----------|----|---|---------|------------------|---------|
| 6,727,892 | B1 | * | 4/2004  | Murphy           | 345/173 |
| 7,030,861 | B1 | * | 4/2006  | Westerman et al. | 345/173 |
| 7,124,374 | B1 | * | 10/2006 | Haken            | 715/859 |
| 2005/0204301 | A1 | * | 9/2005  | Keely et al.   | 715/768 |
| 2007/0101292 | A1 | * | 5/2007  | Kupka          | 715/810 |
| 2008/0115078 | A1 | * | 5/2008  | Girgaonkar     | 715/773 |
| 2010/0259493 | A1 | * | 10/2010 | Chang et al.   | 345/173 |
| 2011/0252349 | A1 | * | 10/2011 | Chaudhri       | 715/769 |

* cited by examiner

*Primary Examiner* — Michael Roswell
(74) *Attorney, Agent, or Firm* — Lee, Hong, Degerman, Kang & Waimey

(57) ABSTRACT

A mobile terminal is disclosed. According to one embodiment, the mobile terminal includes: a housing including a front side, a rear side and a plurality of lateral sides; a touchscreen located on the front side of the housing, configured to display at least one touch-executable object, and including a predefined edge region; and a controller. The controller is configured to preempt execution of a function corresponding to a particular object of the at least one touch-executable object if a first touch of the particular object is detected in the predefined edge region of the touchscreen.

19 Claims, 37 Drawing Sheets

MOBILE TERMINAL AND CONTROLLING METHOD THEREOF

Pursuant to 35 U.S.C. §119(a), this application claims the benefit of earlier filing date and right of priority to Korean Application No. 10-2010-0066784, filed on Jul. 12, 2010, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for facilitating a terminal to be used in further consideration of user's convenience.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Recently, a size of a display screen of a mobile terminal is ongoing to increase.

However, in order to increase a size of a screen, it is necessary to increase a size of a terminal housing to accommodate the screen therein. And, it may cause a problem that a user is inconvenient to carry a mobile terminal. In order to facilitate a terminal user to carry a mobile terminal, a size of a terminal housing needs to be maintained as small as possible despite an increasing size of a display screen. And, the terminal user needs to have no difficulty in manipulating the mobile terminal. Therefore, many efforts need to be made to develop and research a method of preventing the difficulty or inconvenience for a terminal user.

SUMMARY

Accordingly, embodiments of the present invention are directed to a mobile terminal and controlling method thereof that substantially obviate one or more problems due to limitations and disadvantages of the related art.

Aspects of the present invention are directed to providing a mobile terminal and controlling method thereof, by which a terminal user is facilitated to carry a mobile terminal in a manner of maintaining a size of a terminal housing as small as possible despite an increasing size of a display screen.

Other aspects of the present invention are directed to providing a mobile terminal and controlling method thereof, by which the terminal user has no (or a reduced level of) difficulty or inconvenience in manipulating the mobile terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

According to one embodiment, a mobile terminal includes: a housing including a front side, a rear side and a plurality of lateral sides; a touchscreen located on the front side of the housing, configured to display at least one touch-executable object, and including a predefined edge region; and a controller. The controller is configured to preempt execution of a function corresponding to a particular object of the at least one touch-executable object if a first touch of the particular object is detected in the predefined edge region of the touchscreen.

According to one embodiment, a method of controlling a mobile terminal is disclosed. The method includes: displaying, by a touchscreen, at least one touch-executable object, wherein the touchscreen is located on a front side of a housing of the mobile terminal and includes a predefined edge region; detecting a first touch of a particular object of the at least one touch-executable object; and preempting execution of a function corresponding to the particular object if the first touch is detected in the predefined edge region of the touchscreen.

It is to be understood that both the foregoing general description and the following detailed description of embodiments of the present invention are exemplary and explanatory and are intended to provide further explanation of the embodiments of the present invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DETAILED DESCRIPTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile terminals, such as mobile phones, user equipment, smart phones, mobile computers, digital broadcast terminals, personal digital assistants, portable multimedia players (PMP) and navigators.

Figure 1:
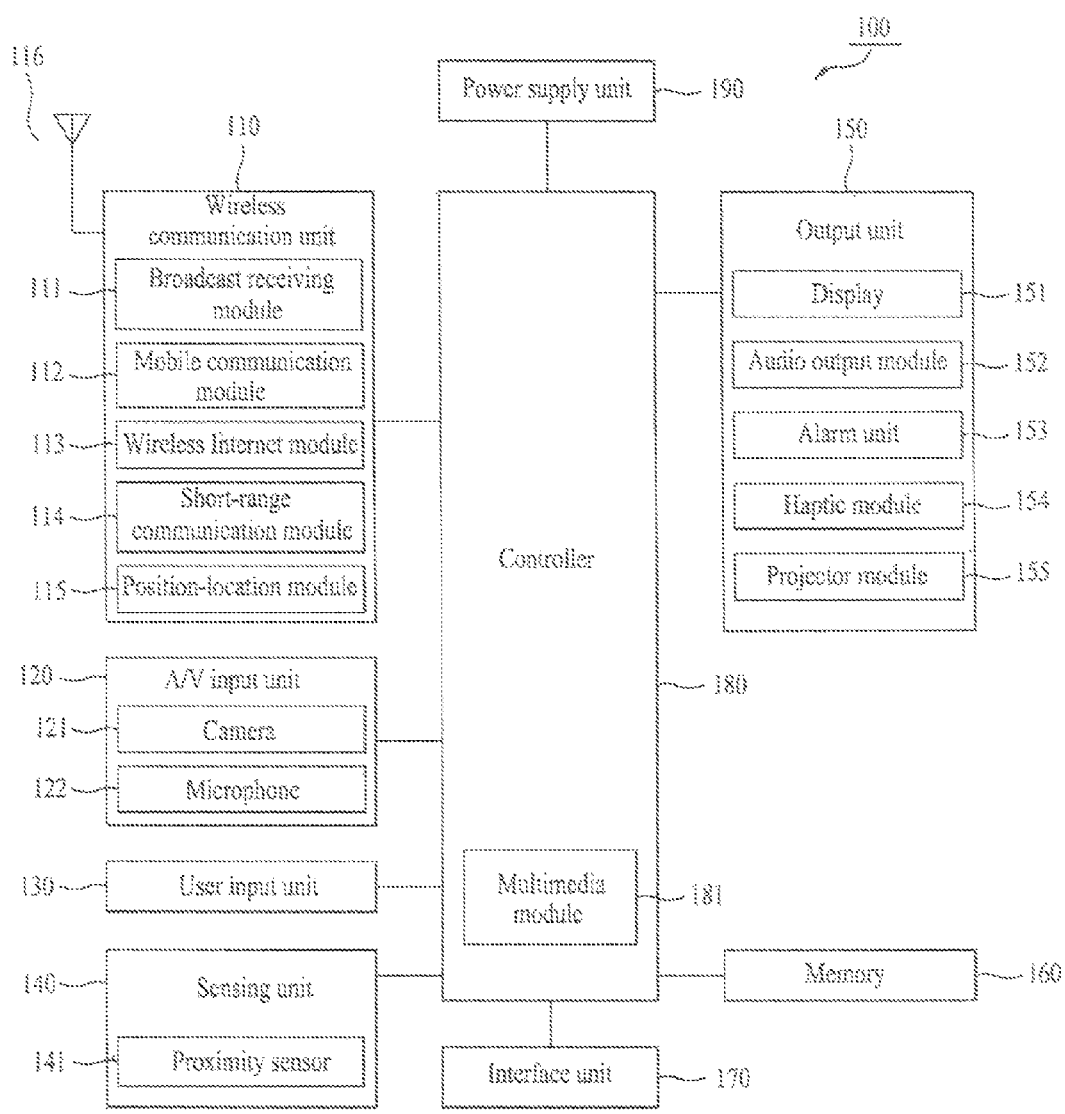
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless Internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless Internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless Internet access by Wibro, HSPDA, GSM, CDMA, WCDMA, LTE or the like is achieved via a mobile communication network. In this aspect, the wireless Internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The meaning of 'touch' mentioned in this disclosure conceptually includes both 'proximity touch' and 'contact touch' unless otherwise indicated.

The proximity sensor detects a proximity touch and a proximity touch pattern (e.g., a proximity touch distance, a proximity touch direction, a proximity touch speed, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 outputs a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output module 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory 160. Moreover, data for various patterns of vibration and/or sound outputted in case of a touch input to the touchscreen can be stored in the memory 160.

When a terminal user performs a first touch to a specific edge region of the touchscreen, information of a first-touched position can be cumulatively stored in a database in the memory 160. The specific edge region and the first touch shall be described later.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 100 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
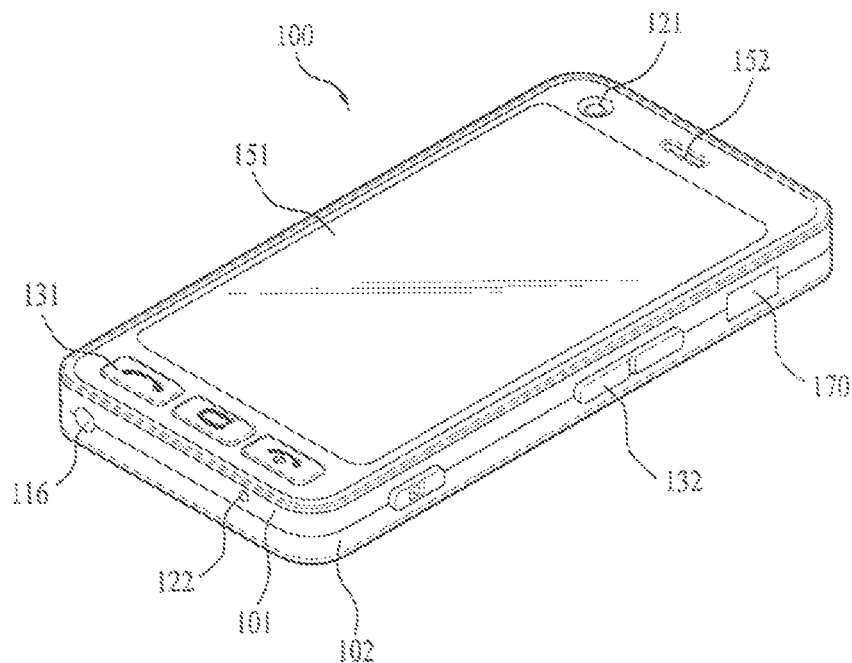
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output module 152, a camera 121, user input units 130/131 and 132, a microphone 122, an interface 170 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 2B:
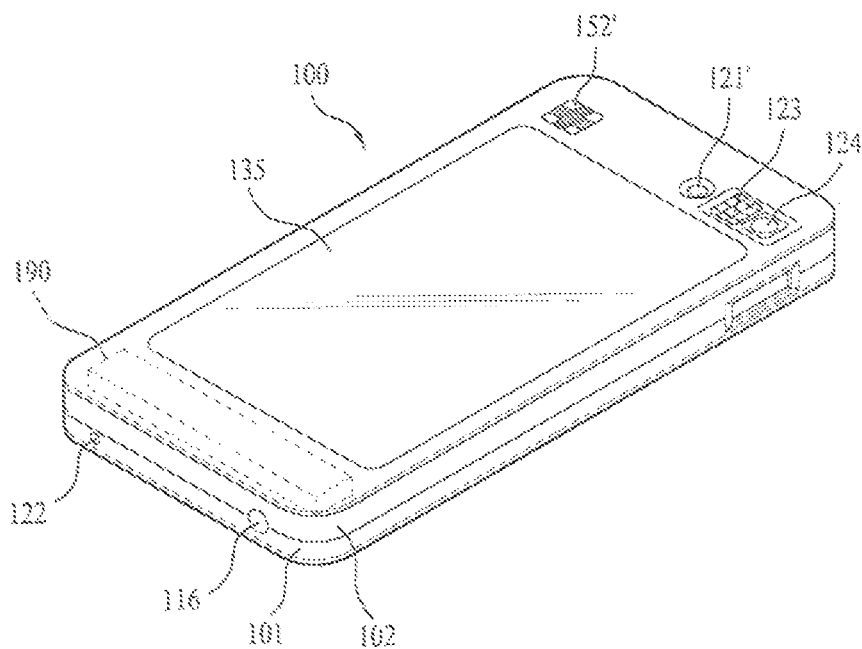
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

The above-described mobile terminal can be configured as a tablet PC type as well. This is explained in detail with reference to FIG. 3A and FIG. 3B as follows.

Figure 3A:
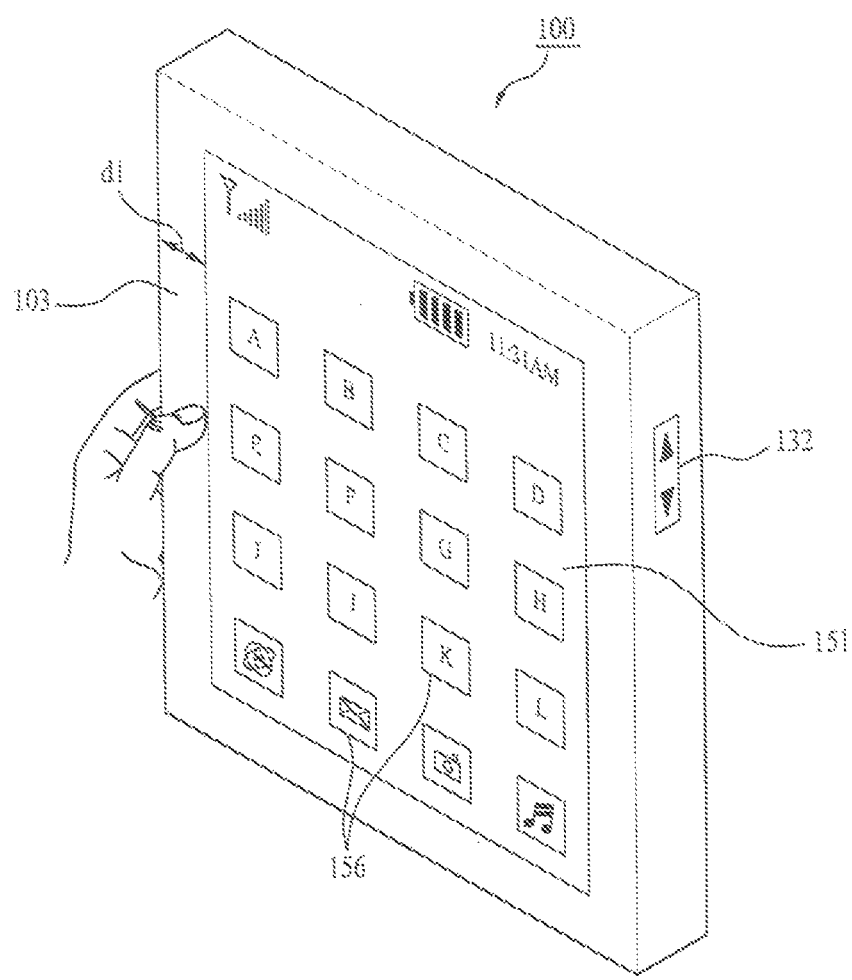
FIG. 3A and FIG. 3B are front perspective diagrams of a mobile terminal of a tablet PC type according to the present invention.
Figure 3B:
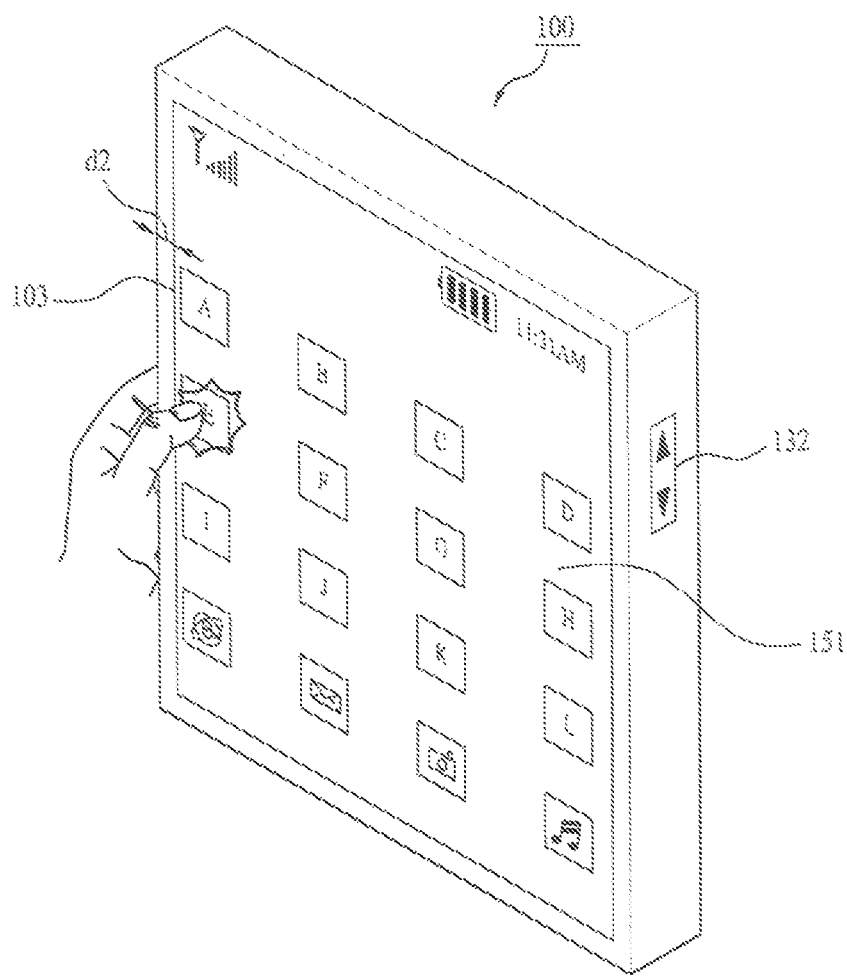

FIG. 3A and FIG. 3B are front perspective diagrams of a mobile terminal of a tablet PC type according to the present invention.

Referring to FIG. 3A, the mobile terminal 100 of the tablet PC type includes a housing constructed with a front side, a rear side and lateral sides. And, a touchscreen 151 can be loaded on the front side of the housing. In this case, at least one or more touch-executable objects 156 can be displayed on the touchscreen 151.

As mentioned in the foregoing description, a user input unit 132 and an interface unit (not shown in the drawing) can be provided to the lateral side(s) of the housing. And, a camera unit (not shown in the drawing) can be provided to the rear side of the housing. This is explained in detail in the foregoing description and its details shall be omitted from the following description for clarity.

A frame region 103 around the touchscreen 151 exists on the front side of the housing having the touchscreen loaded thereon. In this case, referring to FIG. 3A, the frame region 103 is a hand-held part of the mobile terminal for a terminal user to hold the mobile terminal of the tablet PC type to use.

The frame region 103 can have a width $d_1$ wide enough for the terminal user to firmly hold the mobile terminal of the tablet PC type in hand(s).

Yet, if a size of the housing is constant but the width of the frame region 103 increases, a size of the touchscreen decreases.

If the size of the housing is constant but the size of the touchscreen increases, referring to FIG. 3B, the width ($d_2 < d_1$) of the frame region 103 decreases.

Once the width of the frame region decreases, when the terminal user holds the mobile terminal of the tablet PC type in hand(s), an edge region of the touchscreen 151 may be unintentionally touched with some finger(s) of the hand(s). This may cause malfunction of the mobile terminal irrespective of terminal user's intention.

In the following description, explained is a method of preventing malfunction due to an unintentional touch to the edge region despite that the touchscreen is loaded on the front side of the housing of the mobile terminal in a manner of decreasing a width of the frame region. A display screen of the touchscreen 151 shall be indicated by a reference number 400 in the following description.

In the following description, embodiments relating to a controlling method implemented in the above-described mobile terminal of the tablet PC type are explained in detail with reference to FIGS. 4 to 5C. In this case, it is a matter of course that the embodiments in the following description are applicable to mobile terminals of other types (e.g., bar type, card type, etc.) as well as the mobile terminal of the tablet PC type.

Figure 4:
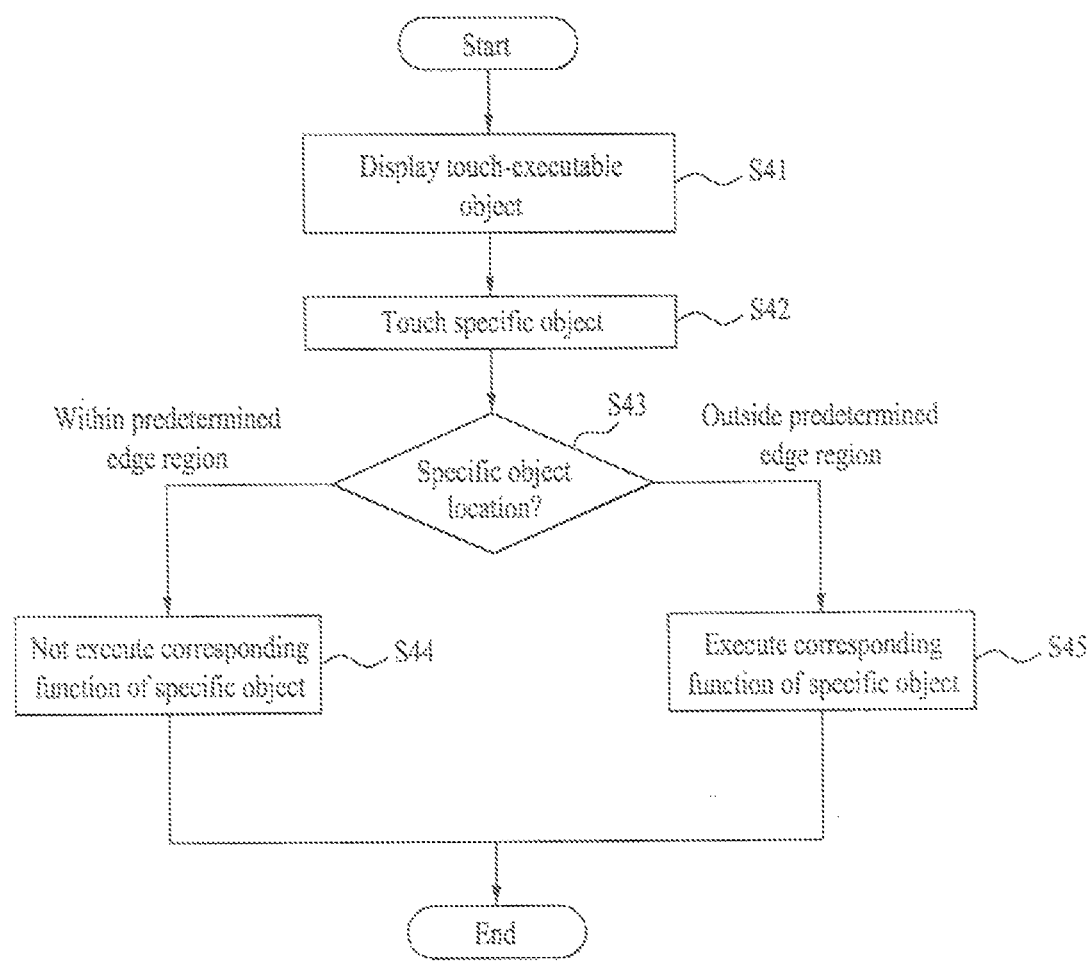
FIG. 4 is a flowchart for a method of controlling a mobile terminal according to an embodiment of the present invention.

FIG. 4 is a flowchart for a method of controlling a mobile terminal according to an embodiment of the present invention. And, FIGS. 5A to 5C are diagrams of display screen configurations of implementing a method of controlling a mobile terminal according to an embodiment of the present invention.

Figure 5A:
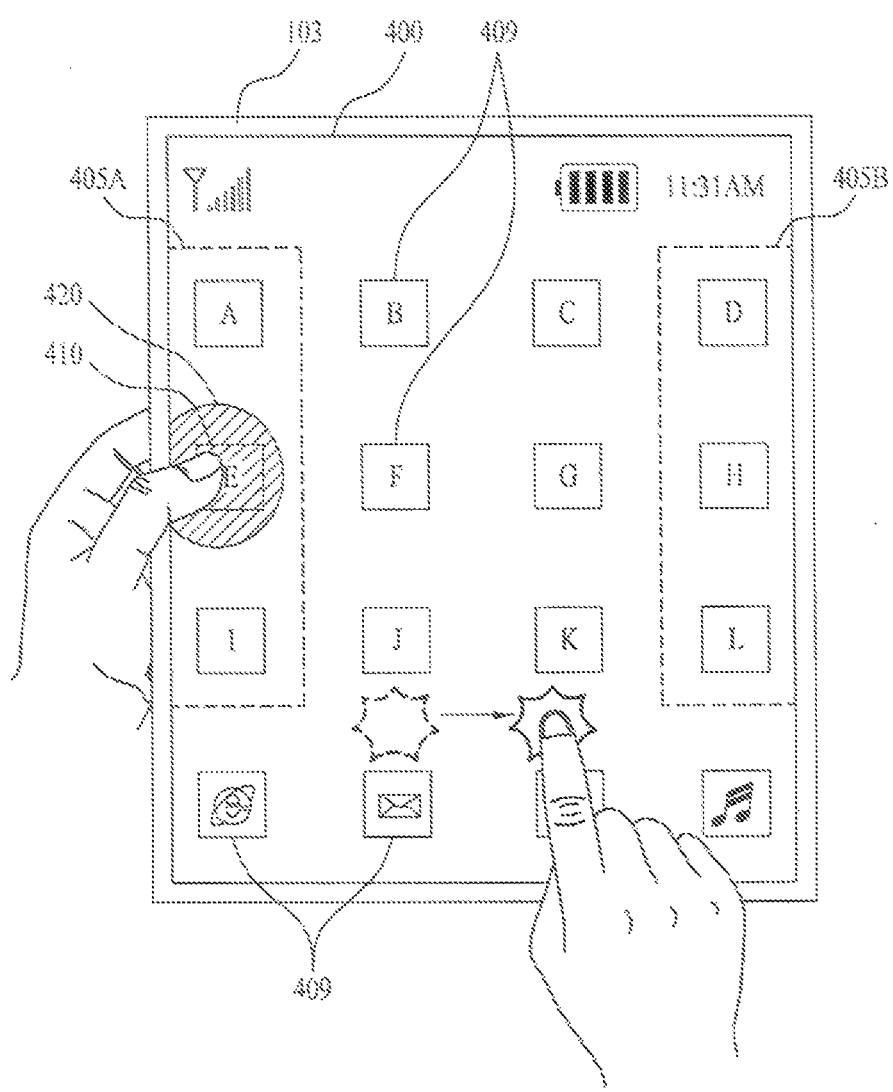
FIGS. 5A to 5C are diagrams of display screen configurations of implementing a method of controlling a mobile terminal according to an embodiment of the present invention.
Figure 5B:
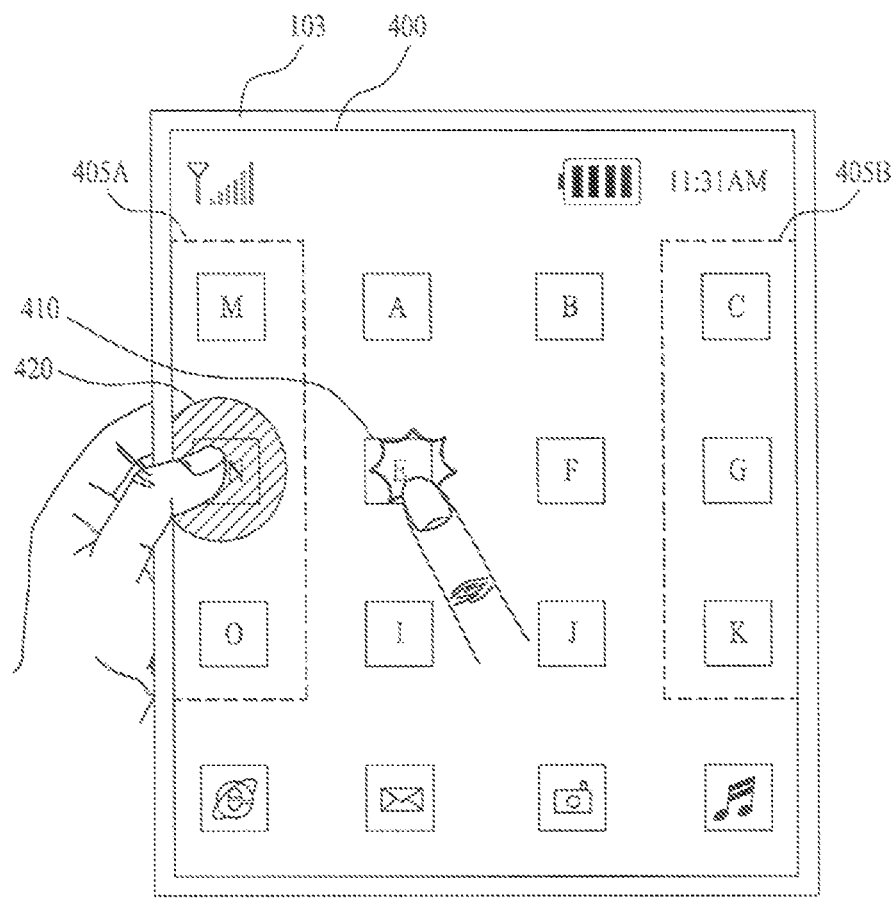

Referring to FIG. 5A, at least one touch-executable objects 409 are displayed on the touchscreen 400 [S41]. In this case, if the object 409 is touched, a corresponding function is executed in the mobile terminal 100. And, an icon, a menu, an execution application, a file, a widget, a list item, a link, a soft key and the like can belong to the object 409. It is not mandatory for the object 409 to be displayed on the touchscreen in a manner of being viewable. The object 409 can be arranged on the touchscreen in a manner of being hidden from view.

An edge region can be predefined on the touchscreen 400. In this case, the edge region can be predefined in at least one of four sides (i.e., a top side, a bottom side, a left side and a right side) of the touchscreen 400. Moreover, the edge region can be predefined as one whole side or a portion of one side.

FIG. 5A exemplarily shows that portions of left and right sides of the touchscreen are predefined as the edge region. In the following description, the edge region of the left side shall be named a left edge region 405A and the edge region of the right side shall be named a right edge region 405B. And, both of the left edge region 405A and the right edge region 405B shall be commonly named an edge region 405.

In FIG. 5A, the left edge region 405A and the right edge region 405B are indicated by dotted lines to enable a terminal user to visually recognize positions of the left and right edge regions 405A and 405B, respectively, by which the present embodiment is non-limited. Alternatively, the left and right edge regions 405A and 405B can be configured to be invisibly prepared on the touchscreen 400.

While the terminal user holds the mobile terminal 100 in a left hand, referring to FIG. 5a, the terminal user may touch the left edge region 405A [S42].

In particular, the terminal user may unintentionally touch a specific object (i.e., an object "E") 410 situated in the left edge region 405A among the touch-executable objects displayed on the touchscreen 400.

If so, the controller 180 determines whether the touched specific object 410 is situated in the edge region 405 [S43].

As a result of the determination in the step S43, the controller 180 determines that the touched specific object 410 is situated in the left edge region 405A and thus may not execute a corresponding function of the touched specific object 410 [S44]. In particular, the controller 180 may not recognize the touch to the edge region as a user command for executing the corresponding function of the specific object 410.

And, the controller 180 is able to control an alarm to be outputted to indicate that the touch to the edge region is not recognized as a user command. In this case, the alarm can include at least one of a sound, a vibration and a graphic. And, it is a matter of course that the alarm may not be outputted. FIG. 5A exemplarily shows the graphic 420 indicating that the touch is not recognized as the user command.

While the mobile terminal 100 is being held, referring to FIG. 5A, a background image on the touchscreen 400 is touched & dragged left to right.

If so, referring to FIG. 5B, objects on the touchscreen 400 can be scrolled left to right in proportion to the drag, whereby the specific object 410 can get out of the left edge region 405A.

Subsequently, the specific object 410 having gotten out of the left edge region 405A can be touched again [S42].

Figure 5C:
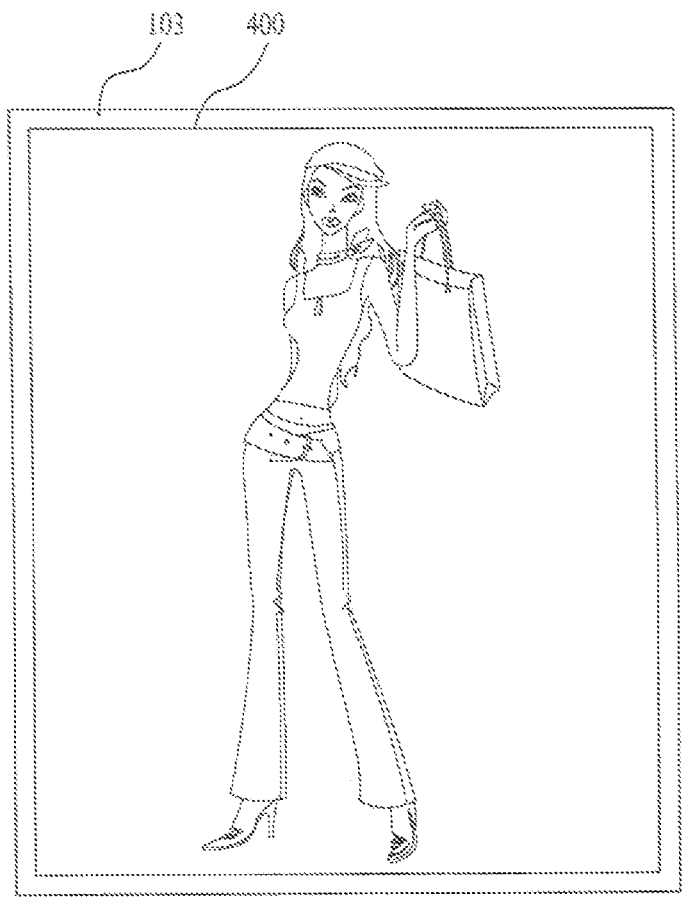

If so, the controller 180 determines that the specific object 410 does not exist in the edge region 405 and is then able to execute a corresponding function of the touched specific object 410, as shown in FIG. 5C [S43, S45]. Referring to FIG. 5C, the specific object 410 is assumed to be an image file. Therefore, as the specific object 410 is touched, the corresponding image is displayed on the touchscreen 400.

It is not mandatory for the edge region touch not to be controlled to be recognized as a user command all the time. Alternatively, it is able to set the edge region touch to be recognized in the mobile terminal 100 by a configuration setting performed by the terminal user through an appropriate manipulation of the user input unit 130.

Alternatively, the controller 180 is able to control to determine whether the edge region touch can be recognized as the user command according to a duration of the touch to the touchscreen 400. For instance, in case that the touch duration of the touch to the edge region is smaller than a predetermined duration (i.e., if the touch is a short touch), the controller 180 is able to control the edge region touch to be recognized as the user command. For another instance, in case that the touch duration of the touch to the edge region is equal to or greater than a predetermined duration (i.e., if the touch is a long touch), the controller 180 is able to control the edge region touch not to be recognized as the user command.

In the following description, various methods for enabling the edge region touch to be occasionally recognized as a user command are explained.

Figure 6:
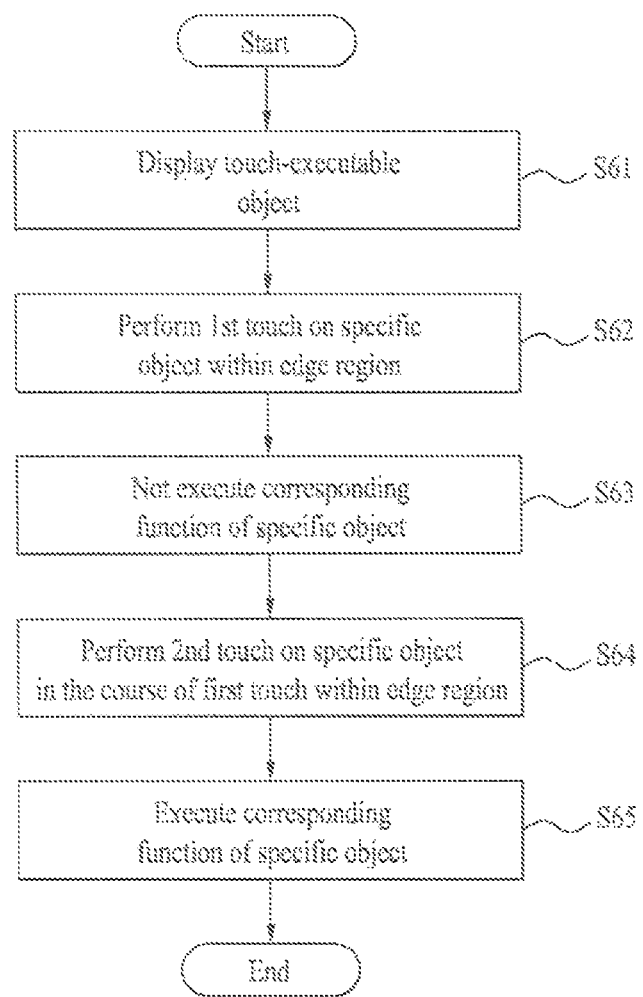
FIG. 6 is a flowchart for a method of controlling a mobile terminal according to an embodiment of the present invention.
Figure 7A:
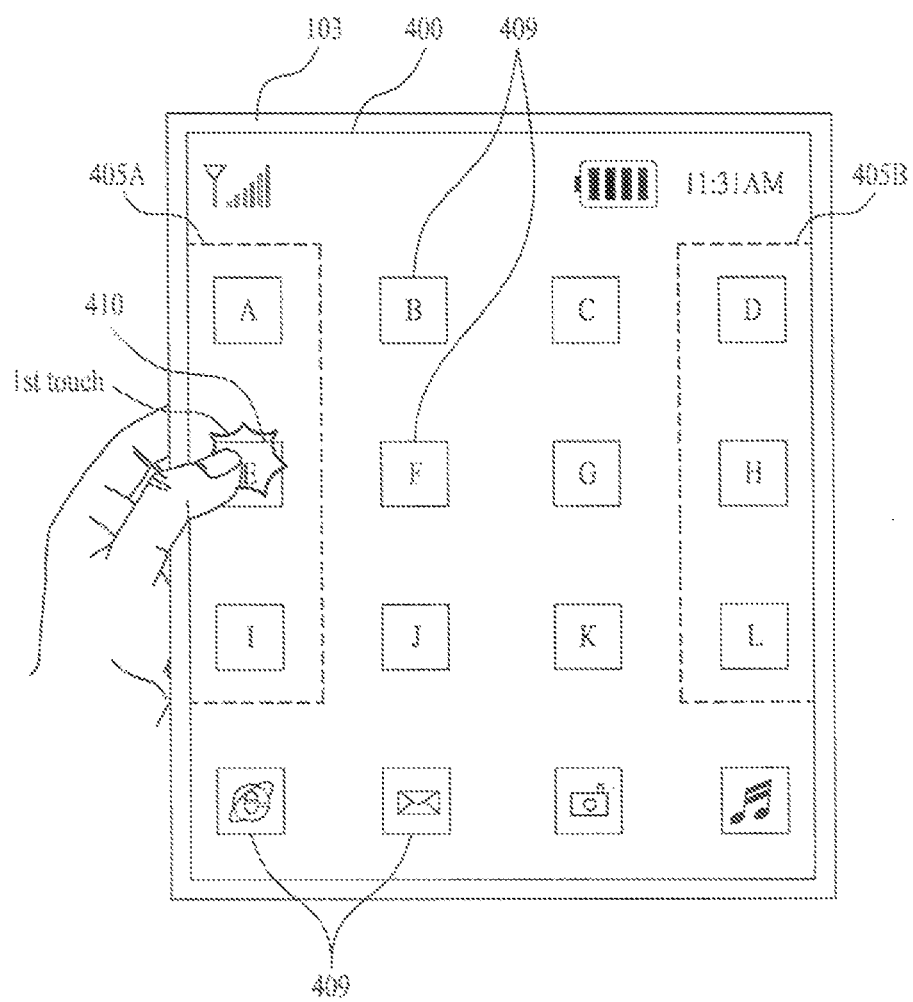
FIG. 7A and FIG. 7B are diagrams of display screen configurations of implementing a method of controlling a mobile terminal according to an embodiment of the present invention.
Figure 7B:
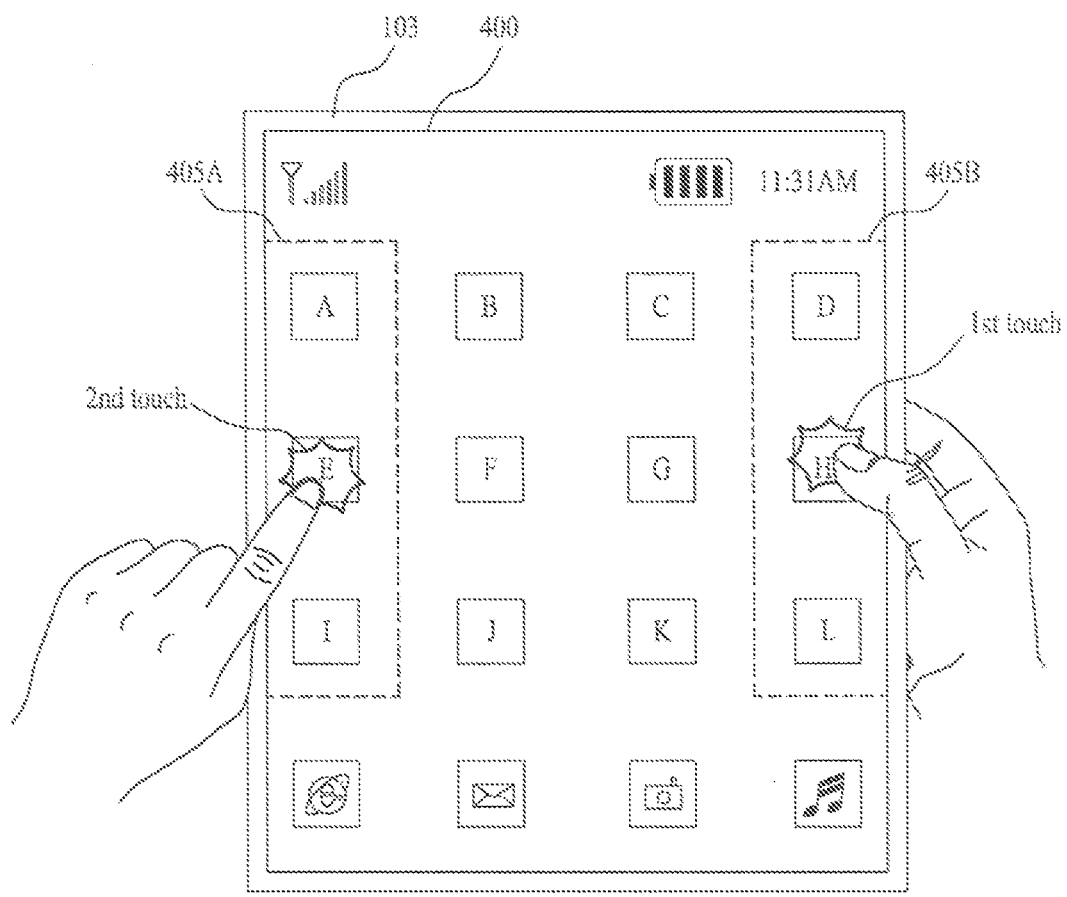

The following description is made with reference to FIG. 6, FIG. 7A and FIG. 7B.

FIG. 6 is a flowchart for a method of controlling a mobile terminal according to an embodiment of the present invention. FIG. 7A and FIG. 7B are diagrams of display screen configurations of implementing a method of controlling a mobile terminal according to an embodiment of the present invention.

Referring to FIG. 7A, a plurality of touchable objects 409 are displayed on the touchscreen 400 [S61].

And, a first touch is performed on the object E 410 in the left edge region 405A [S62]. In this case, the first touch means a touch that is uniquely performed in a situation that another touch is not performed on the touchscreen 400. And, the first touch to the object E 410 can include the touch that is unintentionally performed to hold the mobile terminal 100 in a left hand.

As mentioned in the foregoing description, since the first touch is the touch performed in the edge region 405, the controller 180 does not recognize the first touch as a user command and thus is able to control a corresponding function of the object E 410 not to be executed [S63].

Meanwhile, referring to FIG. 7B, while the first touch is performed in the right edge region 405B of the touchscreen 400, a second touch can be performed on the object E 410 in the left edge region 405A [S64]. In this case, the second touch means a touch performed simultaneously while the first touch is performed on the touchscreen 400. And, the first touch to the right edge region 405B can include the touch unintentionally performed to hold the mobile terminal 100 in a right hand.

If the second touch is performed on the object E 410 in the left edge region 405A while the first touch is being applied, the controller 180 is able to control the corresponding function of the object E 410 to be executed unlike the first touch [S65].

In general, the mobile terminal 100 is held in one of two hands. Therefore, while the first touch is unintentionally performed on the edge region to hold the mobile terminal 100 in one hand, if the second touch is performed on the edge region, the second touch is preferably recognized as the user command to facilitate the utilization of the mobile terminal 100.

The following description is made with reference to FIG. 8 and FIGS. 9A to 9H.

Figure 8:
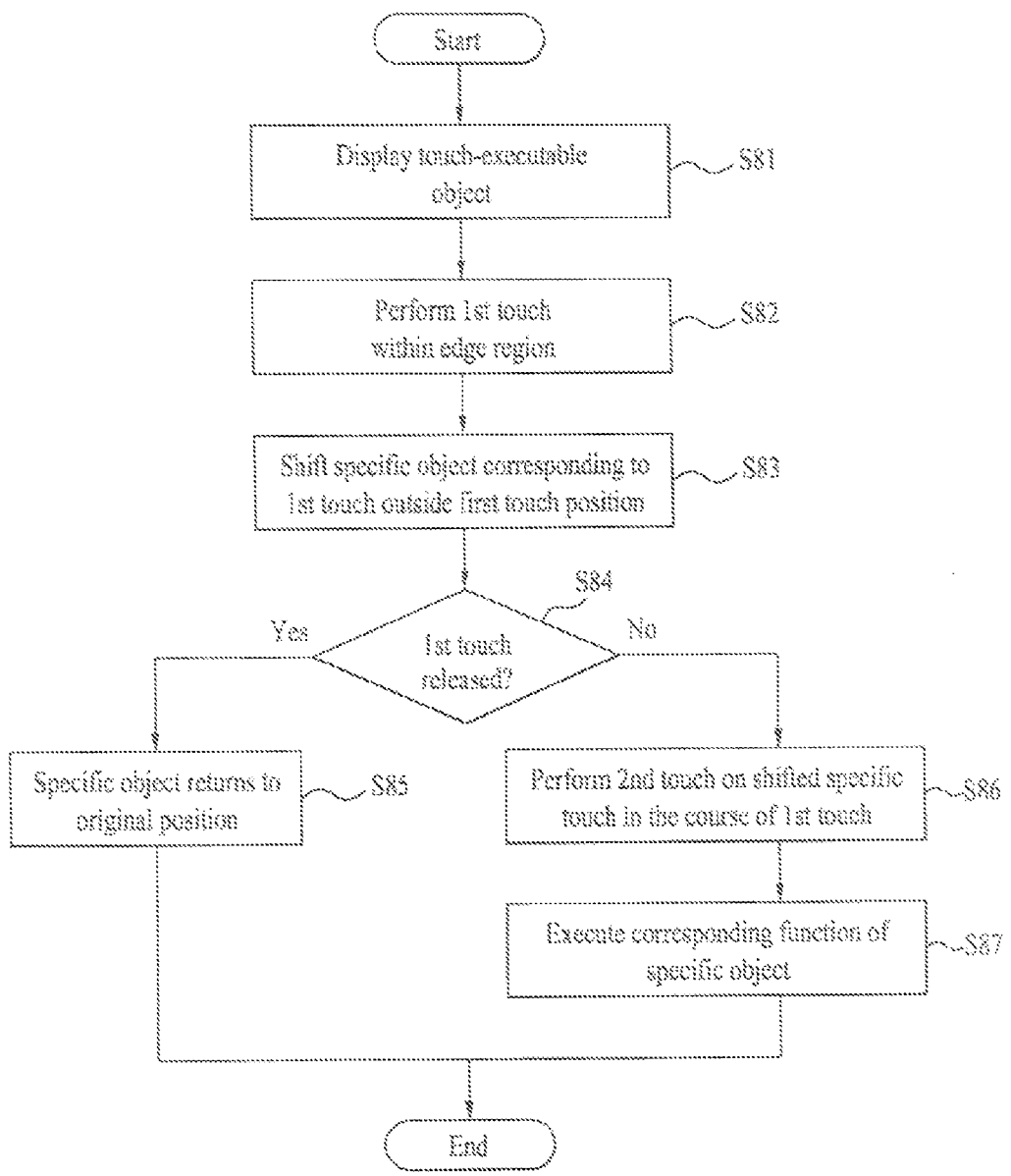
FIG. 8 is a flowchart for a method of controlling a mobile terminal according to an embodiment of the present invention.

FIG. 8 is a flowchart for a method of controlling a mobile terminal according to an embodiment of the present invention. And, FIGS. 9A to 9H are diagrams of display screen configurations of implementing a method of controlling a mobile terminal according to an embodiment of the present invention.

Figure 9A:
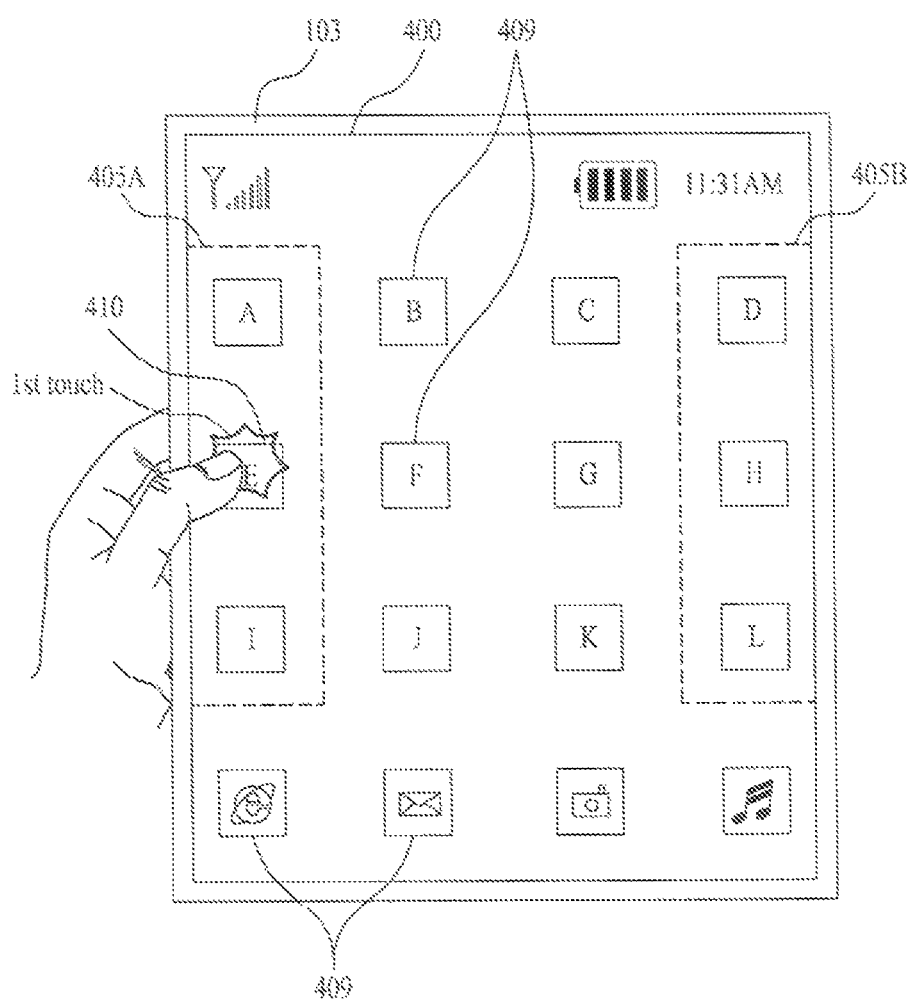
FIGS. 9A to 9H are diagrams of display screen configurations of implementing a method of controlling a mobile terminal according to an embodiment of the present invention.

Referring to FIG. 9A, a plurality of touchable objects are displayed on the touchscreen 400 [S81].

Subsequently, a first touch can be performed on the left edge region 405A [S82].

Figure 9B:
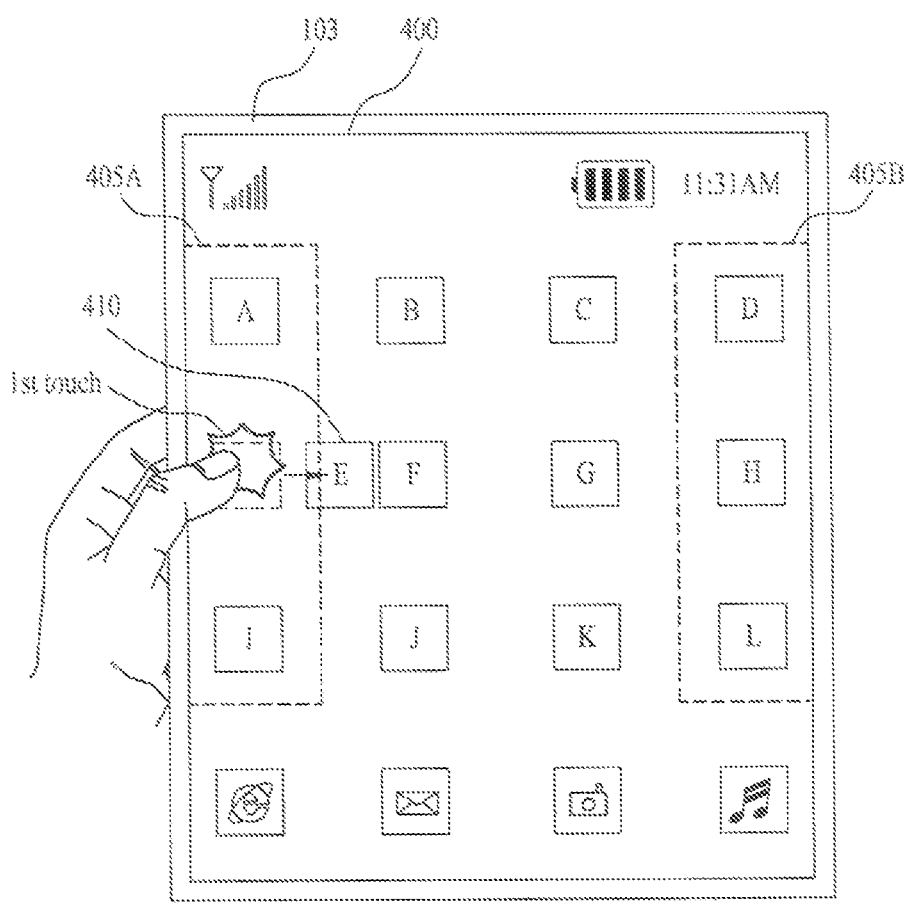

If so, referring to FIG. 9B, the controller 180 is able to control an object E 410, which corresponds to the first touch and is situated in the left edge region 405A, to get out of a position of the first touch or the edge region 405 [S83]. In particular, if the object E 410 gets out of the position of the first touch or the edge region 405, the object E 410 can be shifted in any direction. FIG. 9B exemplarily shows that the object E 410 is configured to get out of the position of the first touch in a manner of being shifted toward a center of the touchscreen 100.

Afterwards, the first touch can be released from the left edge region 405A [S84].

If so, the controller 180 is able to control the object E 410 to return to its original position within the left edge region 405A [S85].

Figure 9C:
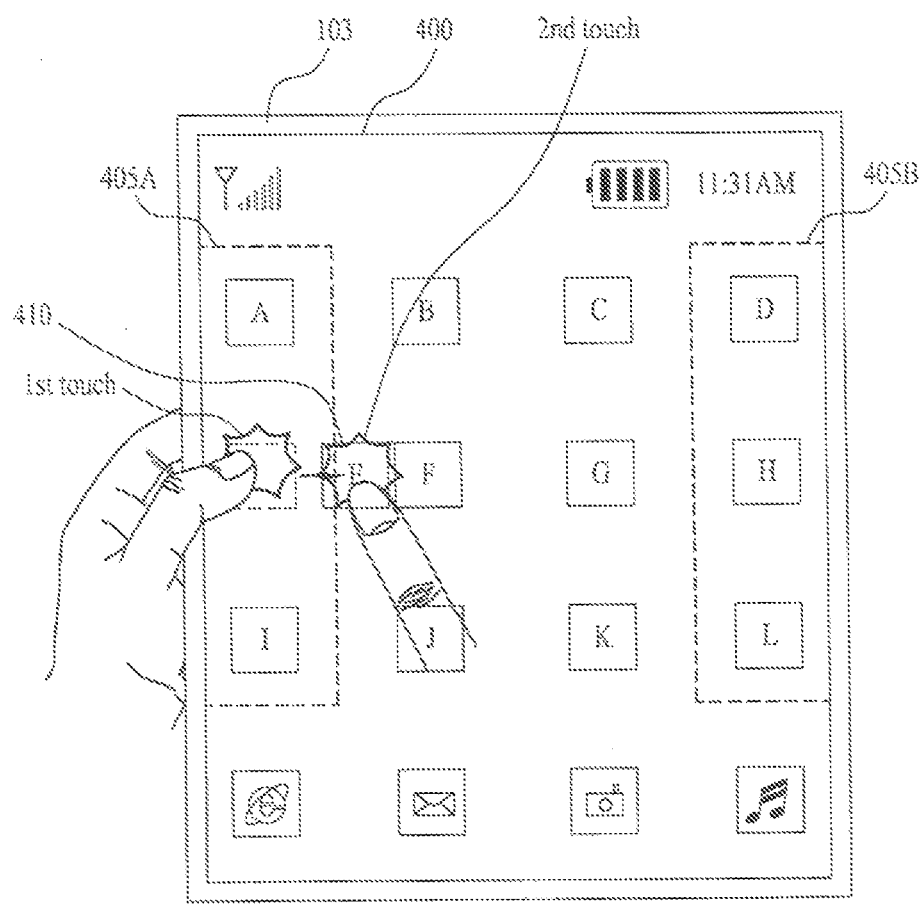

Meanwhile, referring to FIG. 9C, while the first touch is maintained in the left edge region 405A, a second touch can be performed on the shifted object E 410 [S84, S86].

If so, the controller 180 is able to control a corresponding function of the object E 410 to be executed [S87].

In FIG. 9B or FIG. 9C, when the left edge region 405A is touched, the object E 410 corresponding to the first touch is shifted only, by which the present embodiment is non-limited. This is further explained with reference to FIG. 9D as follows.

Figure 9D:
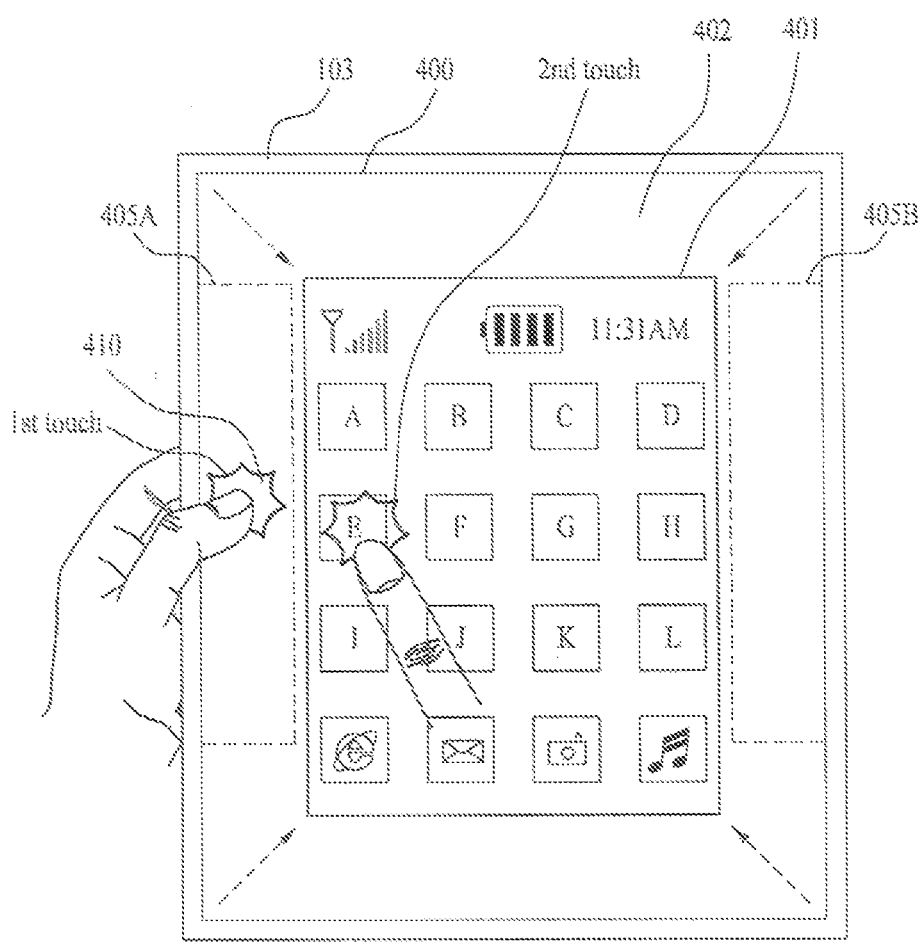

First of all, when the left edge region 405A is touched, the controller 180 is able to control a whole screen of the touchscreen 400 to zoom out (or reduced in size) in a manner that the whole screen gets output outside of the position of the first touch or the edge region 405. FIG. 9D exemplarily shows that a zoom-out whole screen 401 of the touchscreen 400 is displayed on the touchscreen 400 in a manner of getting out of the edge region 405.

Therefore, a terminal user is able to execute a corresponding function by touching a desired object within the zoom-out whole screen 401 while the first touch is maintained on the touchscreen 400.

When the whole screen of the touchscreen 400 zooms out, the controller 180 is able to control an outer region 402 to look like a portion of the frame region 103 in a manner that the outer region 402 outside the zoom-out whole screen 401 displays the substantially same exterior (e.g., at least one of color and pattern, etc.) of the frame region 103 of the housing on the touchscreen 400.

In FIG. 9D, if the first touch is performed on the edge region 405, the whole screen of the touchscreen 400 zooms out overall, by which the present embodiment is non-limited. This is further explained with reference to FIG. 9E and FIG. 9F as follows.

Figure 9E:
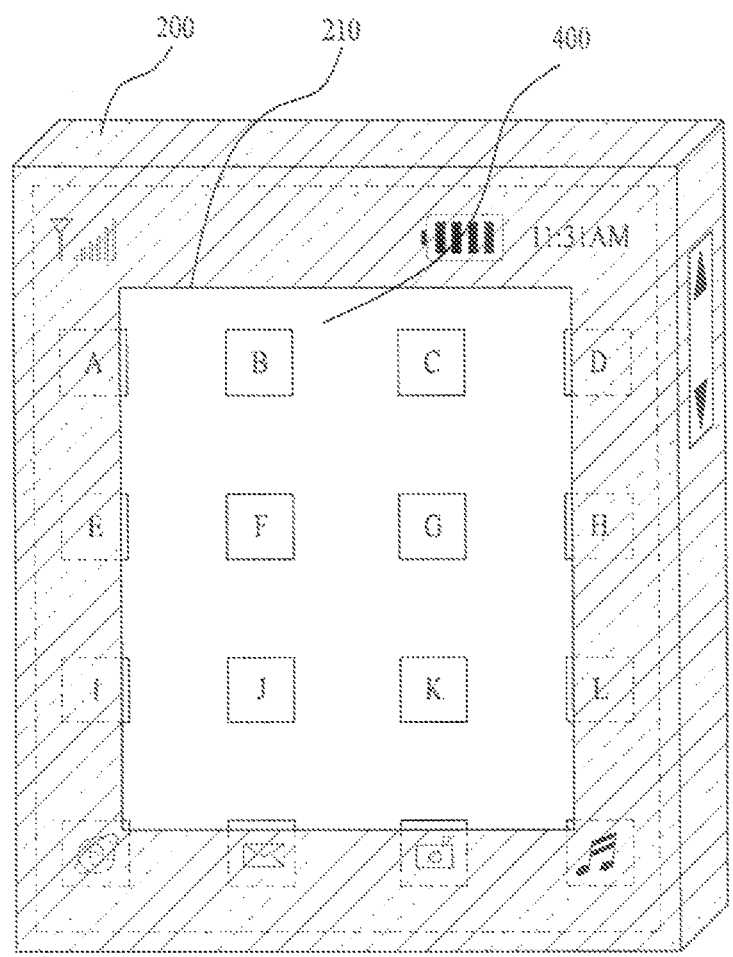
Figure 9F:
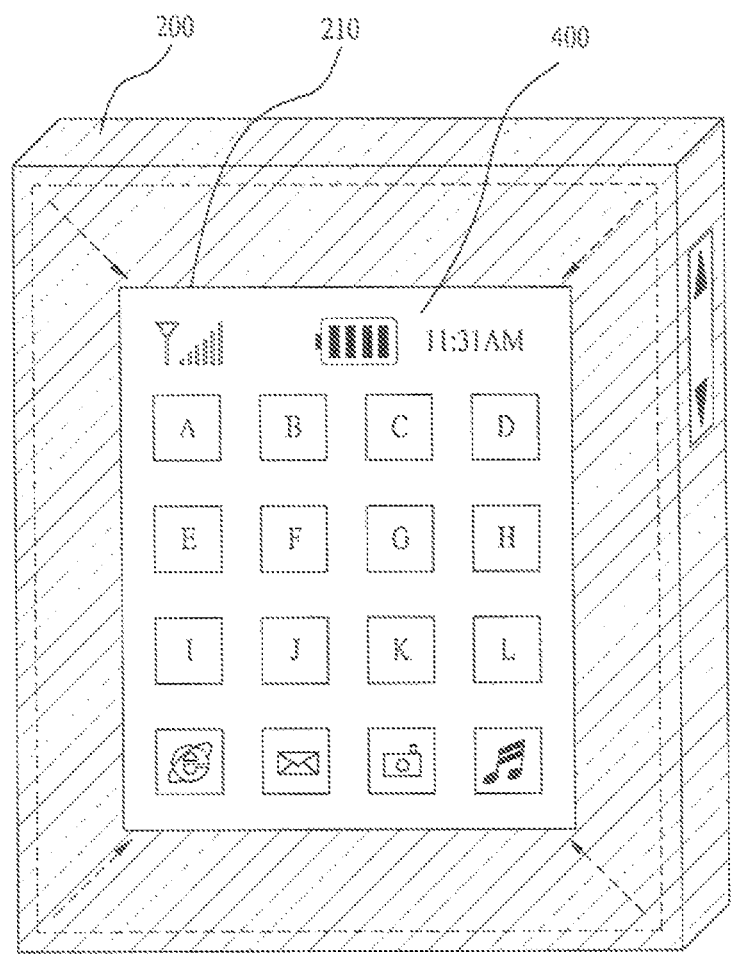

Referring to FIG. 9E, a pouch (or casing) 200 can be detachably loaded on the housing of the mobile terminal 100 to protect the mobile terminal. In this case, the pouch 200 can be provided with an opening 210 open to enable the touchscreen 400 to be externally viewed.

When the pouch is loaded on the mobile terminal 100, it may still block an edge of the touchscreen 400.

Therefore, the controller 180 detects whether the pouch 200 has been loaded on the mobile terminal 100. If the pouch 200 is loaded, referring to FIG. 9F, the controller 180 is able to control the whole screen of the touchscreen 400 to zoom out to be entirely viewed via the opening 210 of the pouch 200.

In this case, there are many methods for the controller 180 to detect whether the pouch 200 has been loaded. For instance, a contact sensor (not shown in the drawing) can be provided to a location brought into contact with the pouch 200 at a lateral or rear side of the housing. Therefore, if the contact sensor senses a contact, the controller 180 is able to detect that the pouch 200 has been loaded on the housing.

Alternatively, a pair of ambient light sensors (not shown in the drawing), i.e., a first ambient light sensor and a second ambient light sensor can be provided to the lateral or rear side of the housing. When the pouch 200 is loaded on the housing, the first ambient light sensor is provided to a position blocked by the pouch 200 and the second ambient light sensor can be provided to a position not blocked by the pouch 200. Therefore, if both of the first and second ambient light sensors are cut off from light, the controller 180 recognizes that the mobile terminal 100 just enters a dark place and then maintains the whole screen of the touchscreen 400 as it is. If the first ambient light sensor is cut off from the light only, the controller 180 is able to detect that the pouch 200 has been loaded on the housing.

Figure 9G:
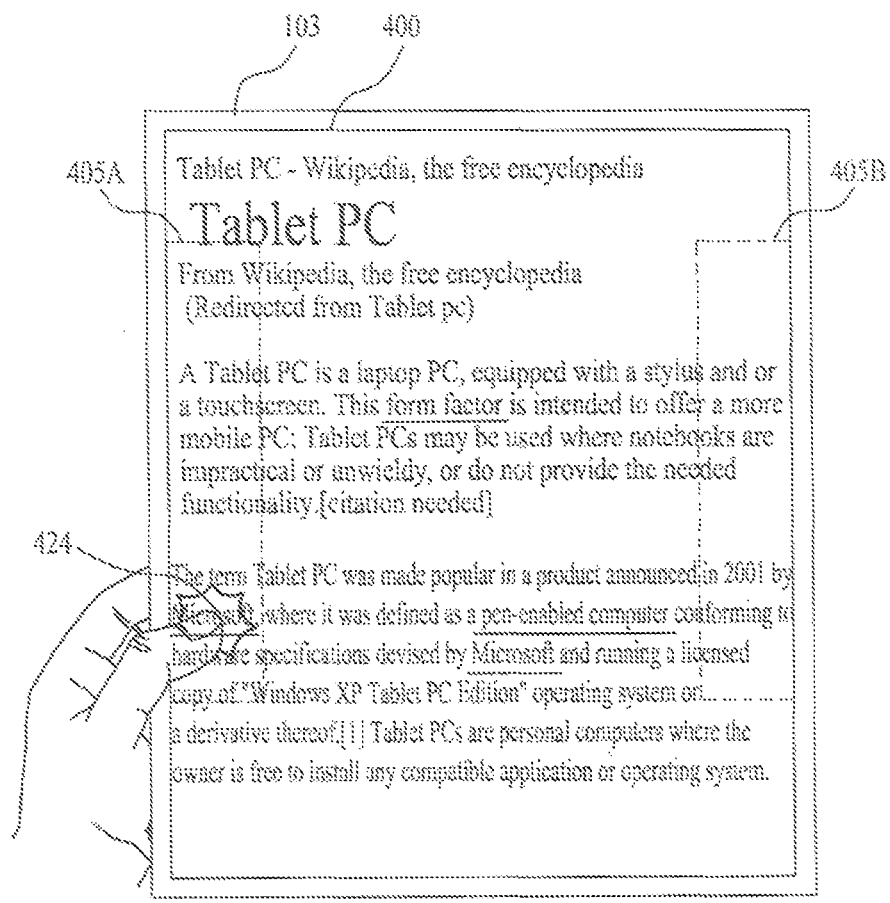
Figure 9H:
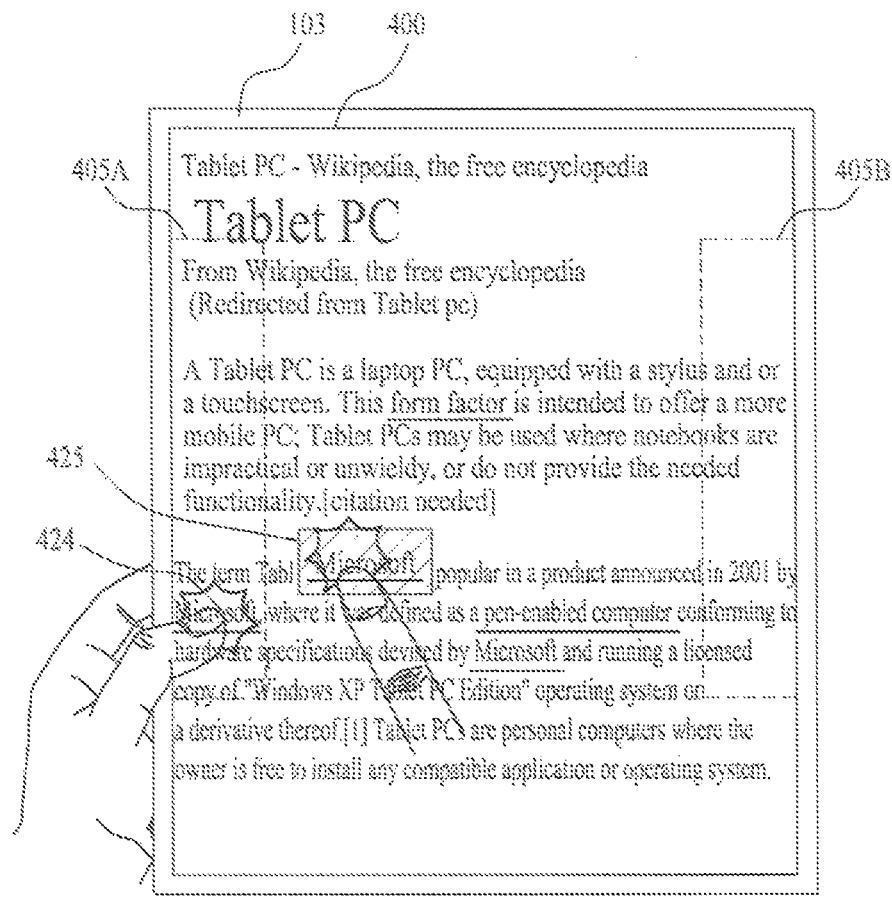

The following description is made with reference to FIG. 9G and FIG. 9H.

Referring to FIG. 9G, the mobile terminal 100 accesses Internet and then executes a web browser. If the web browser is executed, a webpage can be displayed on the touchscreen 400. As mentioned in the foregoing description, links corresponding to touch-executable objects on the webpage can be displayed on the touchscreen 400.

Subsequently, a first touch can be performed on the left edge region 405A. In this case, the first touch can correspond to a specific link 'Microsoft' 424 within the left edge region 405A.

If so, referring to FIG. 9H, the controller 180 is able to generate a popup window 425 of an OSD (on screen display) type, which corresponds to the specific link 424 situated in the left edge region 405A corresponding to the first touch, in a manner that the popup window 425 gets out of the edge region 405. And, the specific link can be displayed on the popup window 425. When the popup window 425 is generated, the specific link 424 can keep being displayed at an original position in the webpage or can disappear from the webpage. FIG. 9H exemplarily shows that the specific link 424 keeps being displayed at the original position on the webpage.

If the popup window 425 gets out of the edge region 405, it can be generated at any position. FIG. 9H exemplarily shows that the popup window 425 is generated at a position out of the edge region 405 in direction of the center of the touchscreen 100 from the specific link 424.

If the specific link displayed on the popup window 425 is touched, the web browser can display a new webpage corresponding to the touched specific link.

Afterwards, the first touch to the left edge region 405A can be released.

If so, the controller 180 is able to control the popup window 425 to disappear. In particular, after the specific link 424 has disappeared in the course of generating the popup window 415, the specific link 424 can re-appear.

In the foregoing description with reference to FIG. 5A, after the first touch has been performed on the edge region 405, it is able to display the graphic 420 indicating that the first touch is not recognized as the user command, by which the present embodiment is non-limited. This is described with reference to FIG. 10 and FIGS. 11A to 11C as follows.

Figure 10:
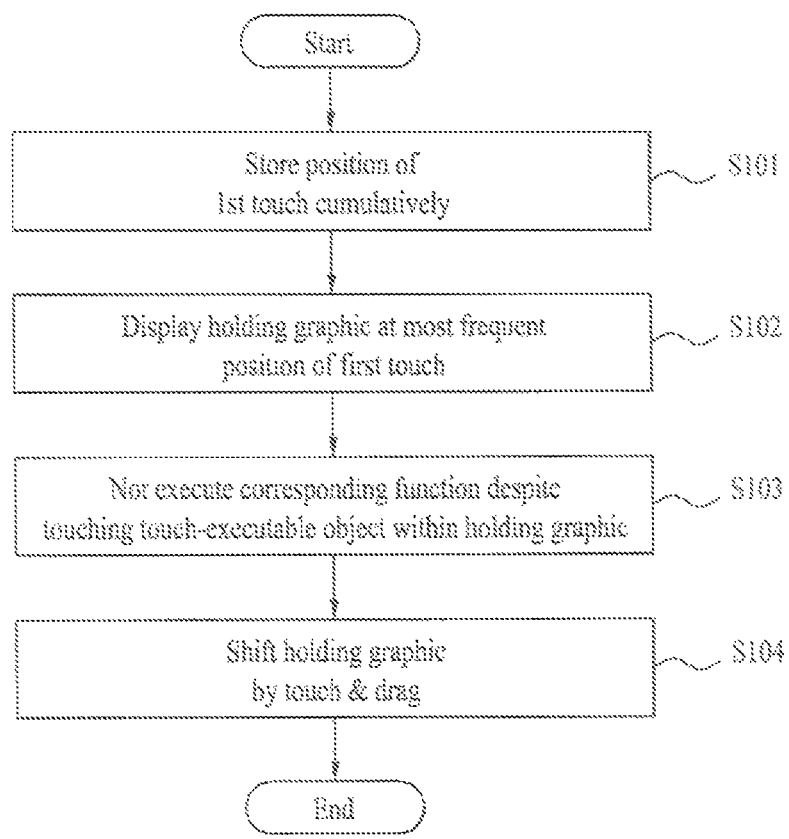
FIG. 10 is a flowchart for a method of controlling a mobile terminal according to an embodiment of the present invention.
Figure 11A:
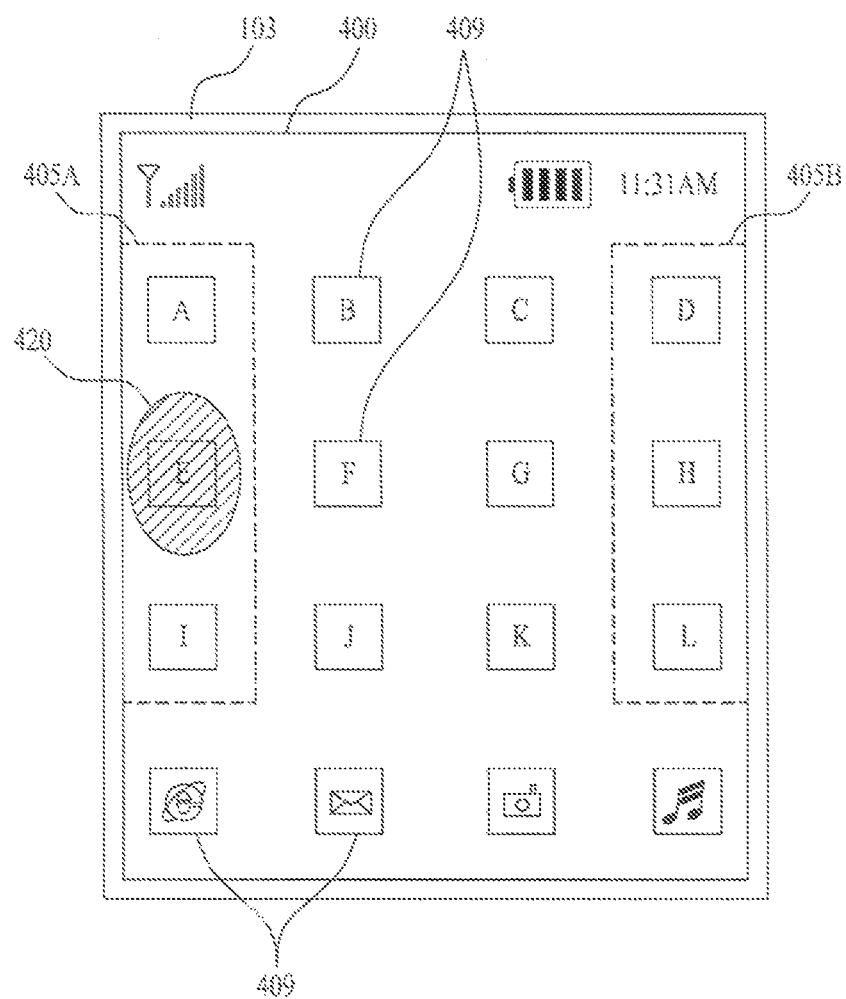
FIGS. 11A to 11C are diagrams of display screen configurations of implementing a method of controlling a mobile terminal according to an embodiment of the present invention.
Figure 11B:
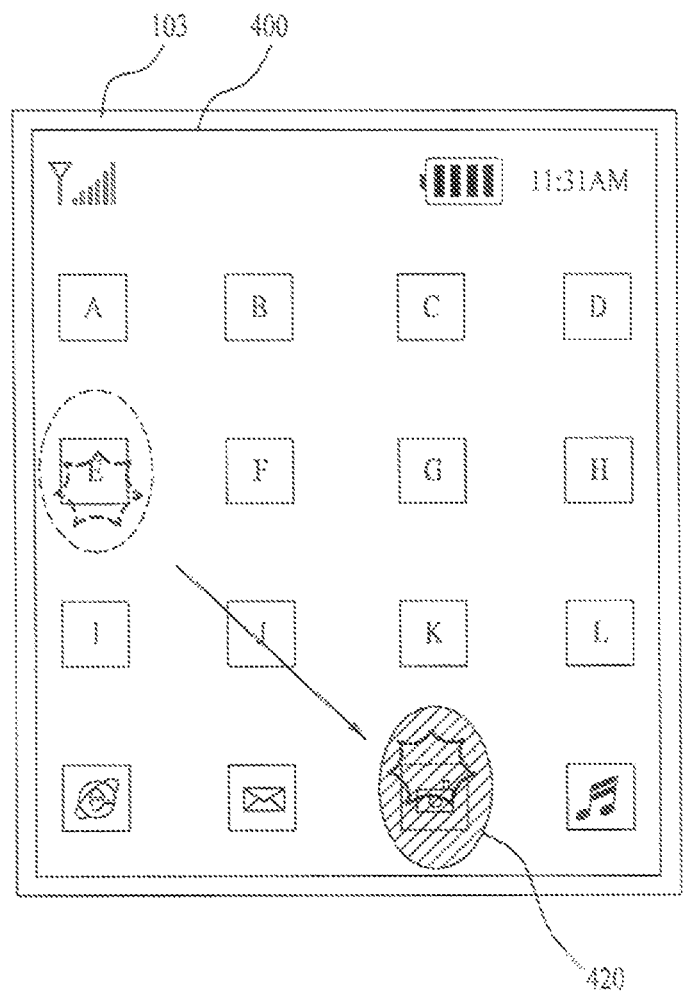
Figure 11C:
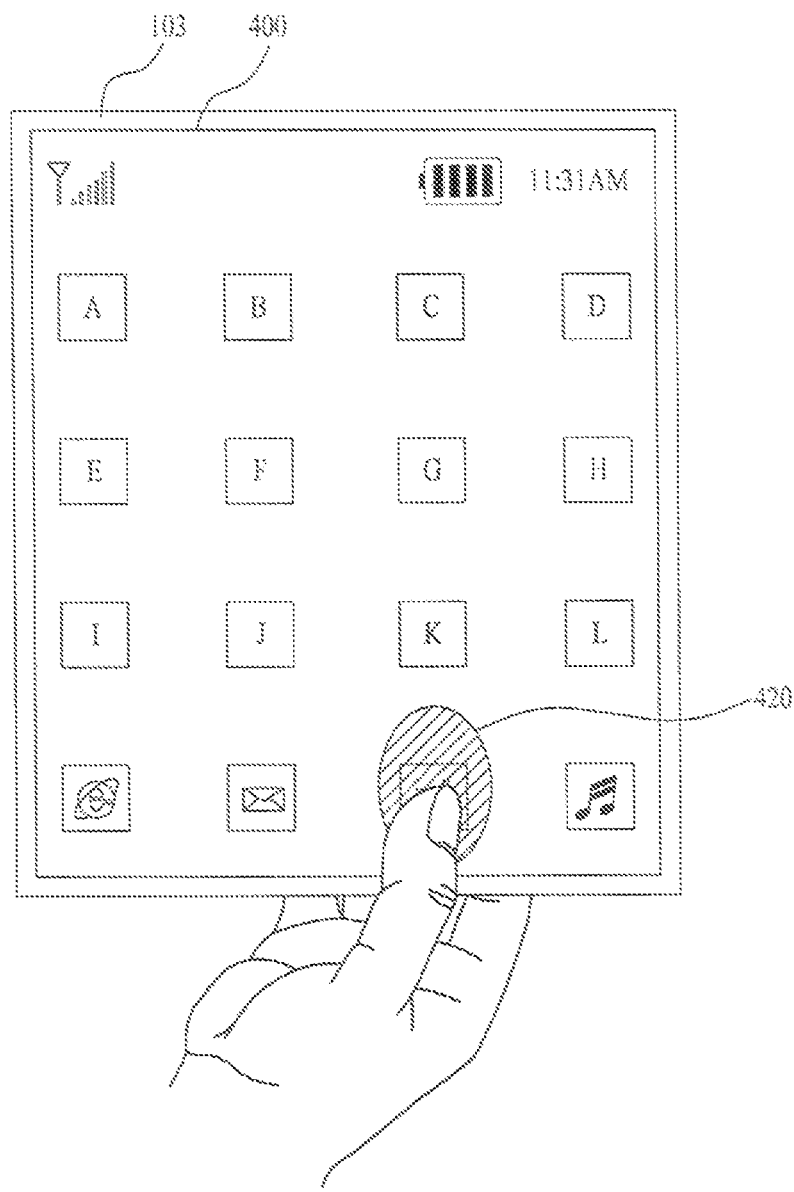

FIG. 10 is a flowchart for a method of controlling a mobile terminal according to an embodiment of the present invention. And, FIGS. 11A to 11C are diagrams of display screen configurations of implementing a method of controlling a mobile terminal according to an embodiment of the present invention.

Referring to FIG. 10 and FIGS. 11A to 11C, each time a first touch is performed on the edge region 405 of the touchscreen 400, a position of the first touch is cumulatively stored in the memory 160 [S101].

According to a terminal user's configuration setting, referring to FIG. 11A, before the first touch is performed on the edge region 405, the controller 180 is able to control a graphic 420 (hereinafter named a holding graphic), which indicates a position for the first touch not to be recognized as a user command, to be displayed on the edge region 405 [S102].

Therefore, if the terminal user holds the mobile terminal 100 in his hand in a manner that a finger of the terminal user is brought into contact with the holding graphic 420, it is able to previously prevent the first touch with the finger from being recognized as the user command by the touchscreen 400 [S103].

In this case, the holding graphic can be displayed at a first touch position of a highest frequency of being cumulatively stored in the memory 160.

The holding graphic 420, as shown in FIG. 11B, can be shifted to a desired position in a whole screen of the touchscreen 400 or a desired position in the edge region 405 by a touch & drag performed by the terminal user [S104].

Therefore, referring to FIG. 11C, the terminal user shifts the holding graphic 420 to the desired position and then holds the mobile terminal 100 in a manner of touching the holding graphic 420 at the desired position with his finger. Thus, it is able to previously prevent the first touch from being recognized as the user command.

In the above description, when the first touch is performed on the edge region 405, the first touch is not executed as a user command irrespective of an application currently executed in the mobile terminal 100, by which the present invention is non-limited. This is further described with reference to FIG. 12, FIG. 13A and FIG. 13B as follows.

Figure 12:
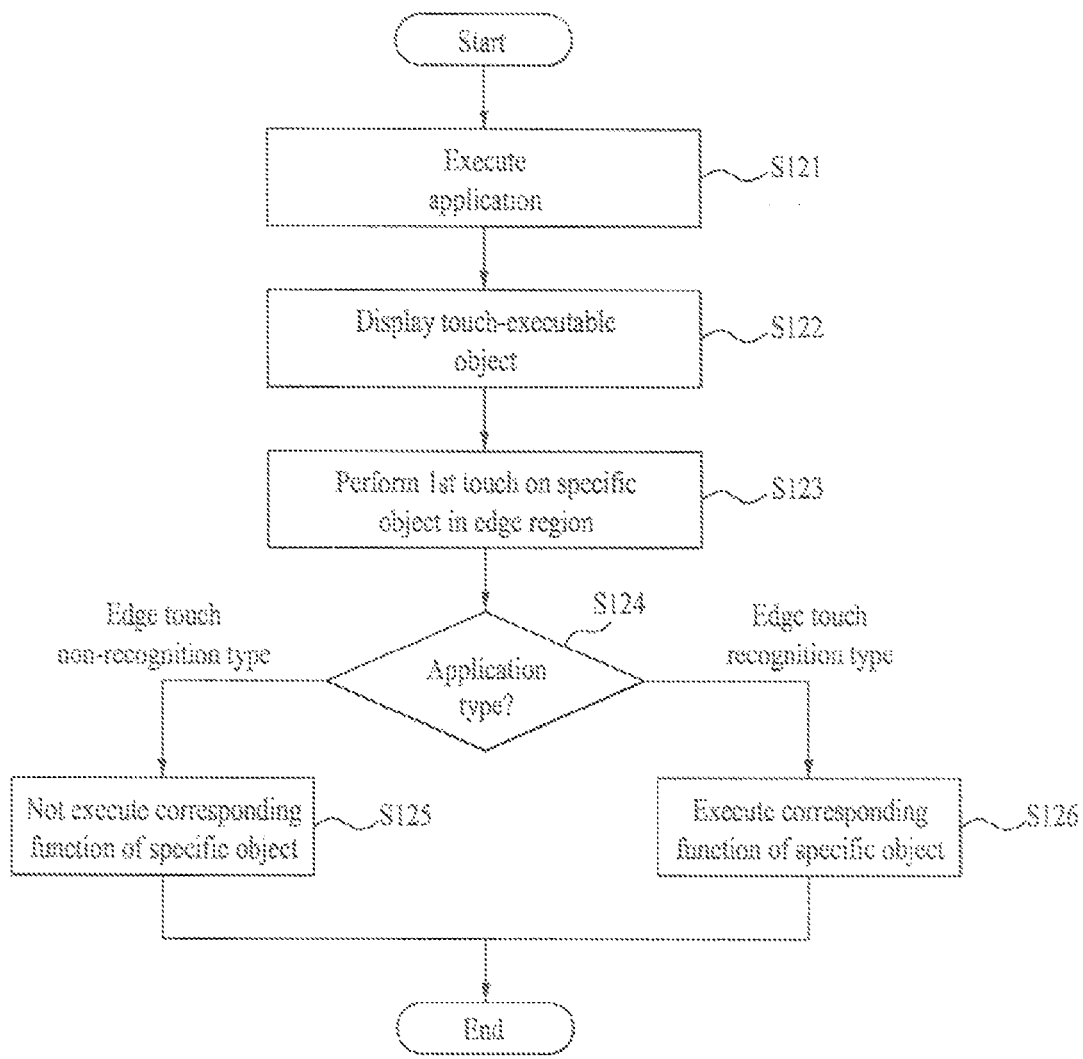
FIG. 12 is a flowchart for a method of controlling a mobile terminal according to an embodiment of the present invention.

FIG. 12 is a flowchart for a method of controlling a mobile terminal according to an embodiment of the present invention. And, FIG. 13A and FIG. 13B are diagrams of display screen configurations of implementing a method of controlling a mobile terminal according to an embodiment of the present invention.

Figure 13A:
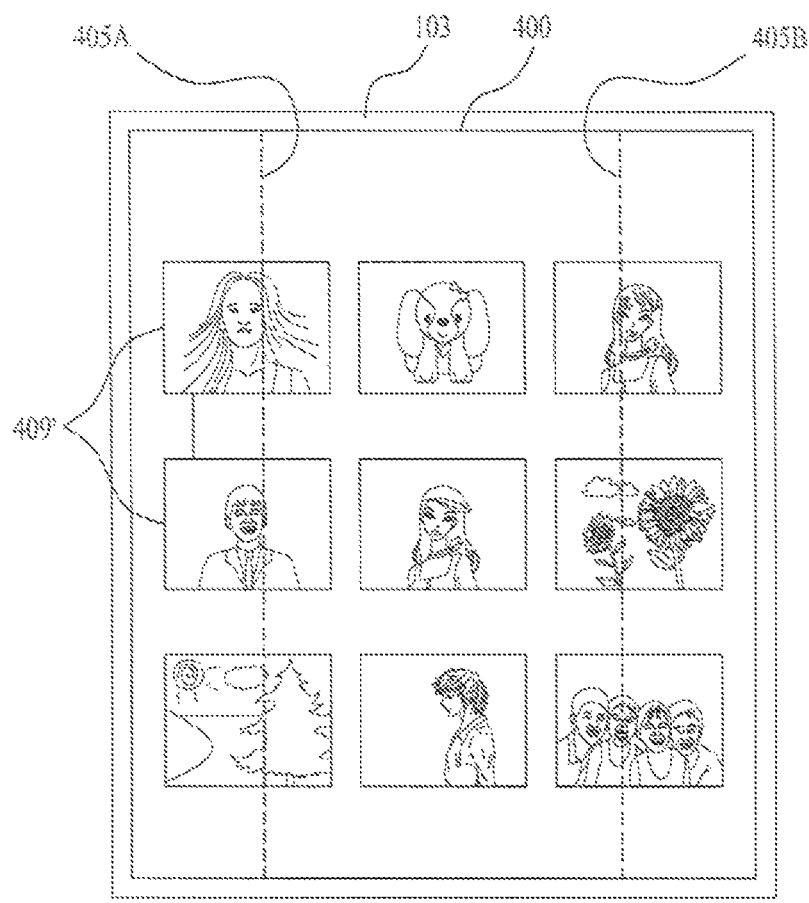
FIG. 13A and FIG. 13B are diagrams of display screen configurations of implementing a method of controlling a mobile terminal according to an embodiment of the present invention.
Figure 13B:
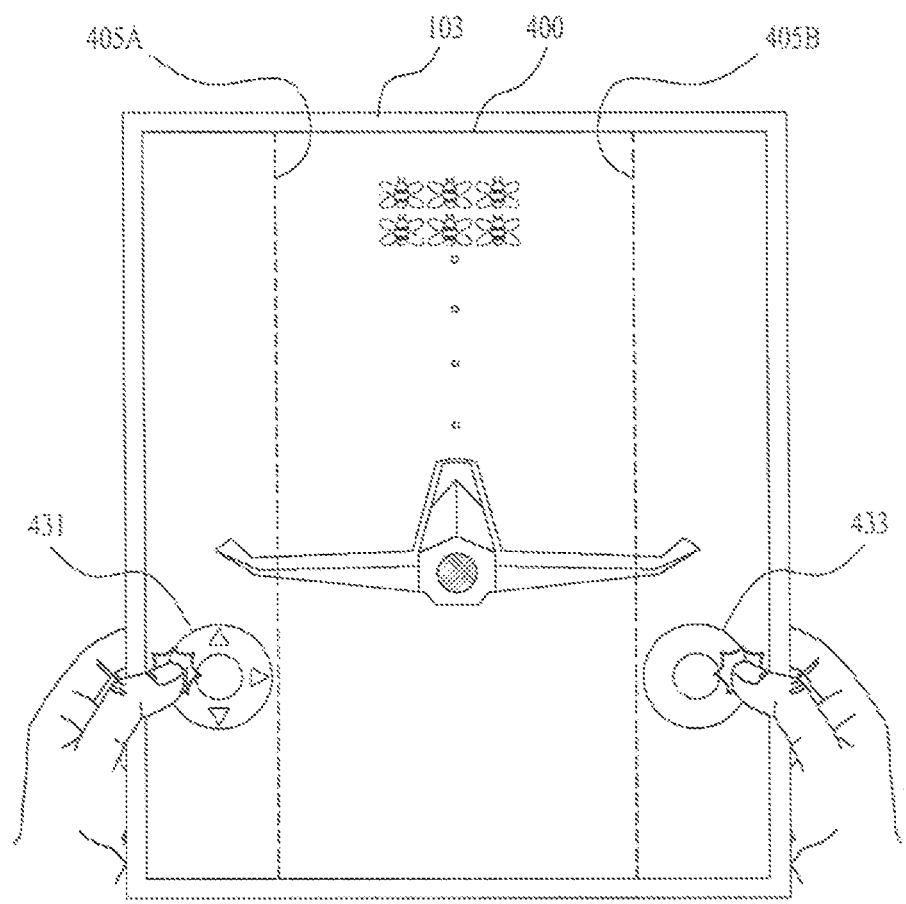

Referring to FIG. 12, FIG. 13A and FIG. 13B, an application can be executed in the mobile terminal 100 [S121].

And, at least one touch-executable object corresponding to the executed application can be displayed on the edge region 405 (e.g., edge regions 405A, 405B) of the touchscreen 400 [S122].

FIG. 13A exemplarily shows that at least one photo thumbnail object 409' is displayed on the edge region 405 of the touchscreen 400 while a photo album application is executed in the mobile terminal 100. And, FIG. 13B exemplarily shows that at least one or more soft keys 431 and 433 for manipulating a game application are displayed on the edge region 405 of the touchscreen 400 while the game application is executed in the mobile terminal 100.

In FIG. 13A and FIG. 13B, the left edge region 405A corresponds to a whole edge region of a left side of the touchscreen 400 and the right edge region 405B corresponds to a whole edge region of the right side of the touchscreen 400.

Afterwards, a first touch can be performed on one object (e.g., object 409', 431 or 433) in the edge region 405 [S123].

If so, the controller 180 determines a type of the application that is being executed [S124]. In particular, the controller 180 determines whether the type of the executed application is an edge touch non-recognition type or an edge touch recognition type.

In this case, the type information may be previously recorded in a header of the executed application.

As a result of the determination, if the type of the executed application is the edge touch non-recognition type, the controller 180 controls a corresponding function for the first-touched object not to be executed [S125].

FIG. 13A exemplarily shows that the photo album application is the application of the edge touch non-recognition type. In particular, referring to FIG. 13A, even if the first touch is performed on the photo thumbnail object in the edge region 405, the controller 180 is able to control the corresponding photo view function not to be executed.

On the contrary, if the type of the executed application is the edge touch recognition type, the controller 180 controls the corresponding function for the first-touched object to be executed [S126].

FIG. 13B exemplarily shows that the game application is the application of the edge touch recognition type. In particular, referring to FIG. 13B, if the first touch is performed on the soft key in the edge region 405, the controller 180 is able to control the corresponding game function to be executed.

Figure 14:
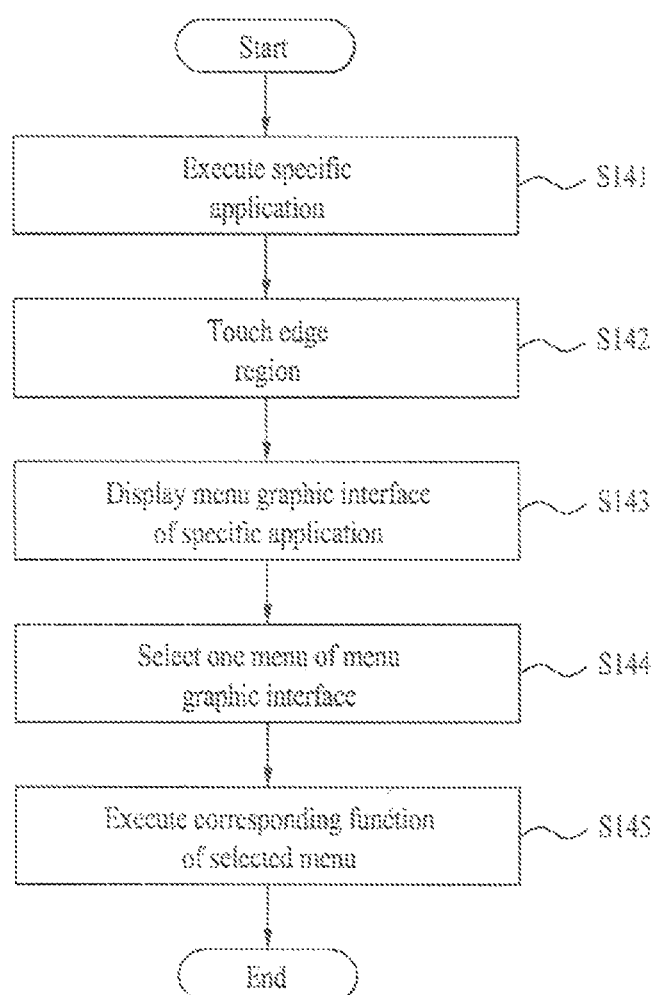
FIG. 14 is a flowchart for a method of controlling a mobile terminal according to an embodiment of the present invention.
Figure 15A:
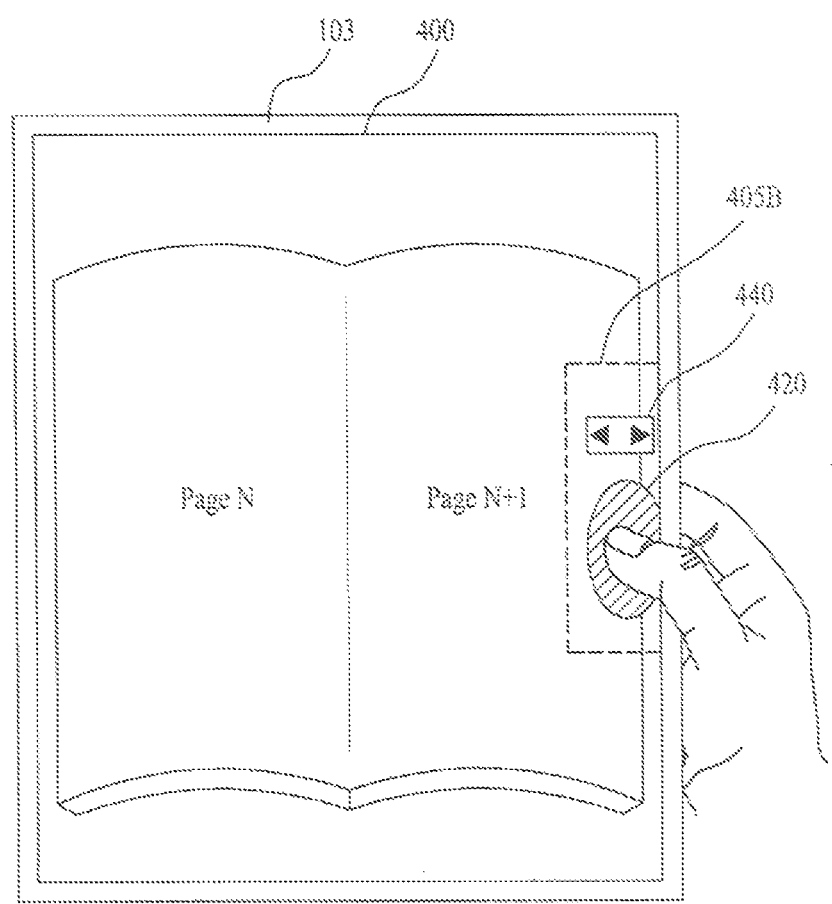
FIG. 15A and FIG. 15B are diagrams of display screen configurations of implementing a method of controlling a mobile terminal according to an embodiment of the present invention.
Figure 15B:
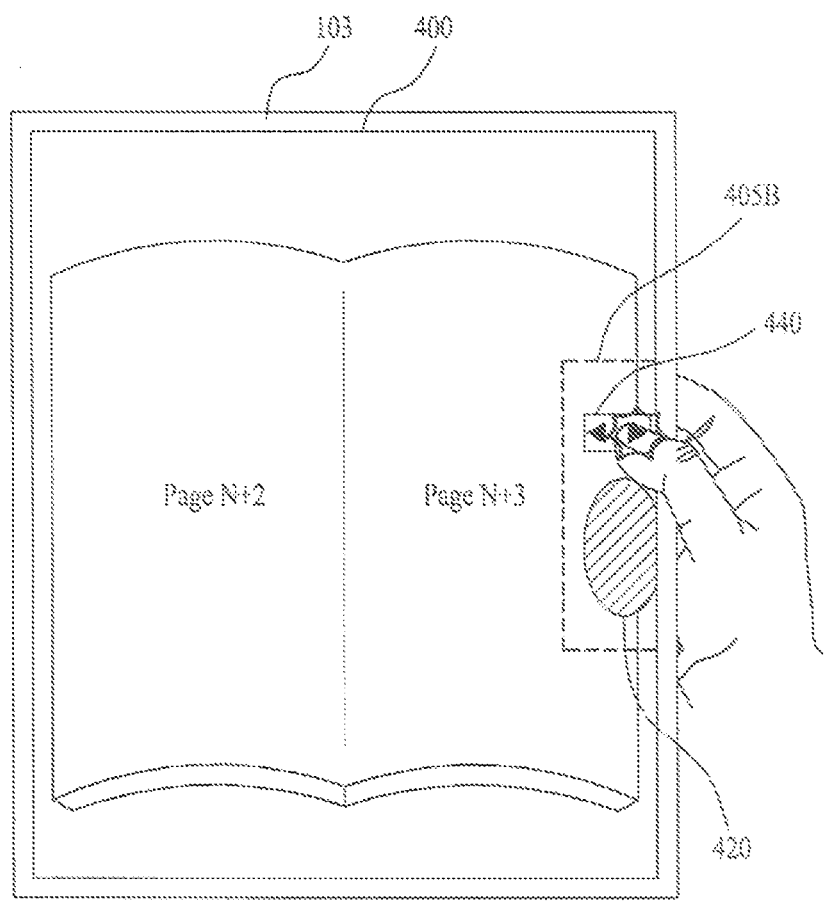

The following description is made with reference to FIG. 14, FIG. 15A and FIG. 15B.

FIG. 14 is a flowchart for a method of controlling a mobile terminal according to an embodiment of the present invention. And, FIG. 15A and FIG. 15B are diagrams of display screen configurations of implementing a method of controlling a mobile terminal according to an embodiment of the present invention.

Referring to FIG. 14, FIG. 15A and FIG. 15B, a specific application can be executed in the mobile terminal [S141].

FIG. 15A and FIG. 15B exemplarily show that an e-book application is executed as the specific application.

While the specific application is being executed, a first touch can be performed on the right edge region 405B of the touchscreen 400 [S142].

Yet, as mentioned in the foregoing description, even if an object corresponding to the first touch exists in the right edge region 405B, the controller 180 is able to control a corresponding function of the object not to be executed.

Instead, referring to FIG. 15A, the controller 180 is able to control a menu graphic interface 440 to be displayed in the vicinity of a position of the first touch in a predetermined distance [S143]. FIG. 15A exemplarily shows that the holding graphic 420 is displayed together with the menu graphic interface 440. Optionally, the holding graphic 420 may not be displayed.

At least one menu icon frequently used for the specific application can be displayed on the menu graphic interface 440. FIG. 15A exemplarily shows that a page turning menu icon for the e-book application is displayed.

If one of the at least one or more menu icons is touched and selected from the menu graphic interface 440, the controller 180 is able to control a function corresponding to the selected menu to be executed in association with the specific application [S145].

The menu graphic interface 440 can be configured to be just displayable while the first touch is maintained. In this case, it is able to configure the corresponding function of the touched menu to be executed by performing a second touch on one of the menus displayed on the menu graphic interface 440.

The menu graphic interface 440 can be configured to keep being displayed from a first touch release timing point to a prescribed time. In this case, referring to FIG. 15B, even if the first touch is released, the menu graphic interface 440 can keep being displayed. If the first touch is performed on one menu displayed on the menu graphic interface 440 again, it is able to configure the corresponding function of the touched menu to be executed.

In the above description, after a fixed edge region has been set on the touchscreen in advance, if a first touch is performed on the fixed edge region, the first touch is not recognized as a user command, by which the present embodiment is non-limited. Namely, it is not mandatory for the edge region to be previously set to be fixed. This is explained in detail with reference to FIG. 16, FIG. 17A and FIG. 17B as follows.

Figure 16:
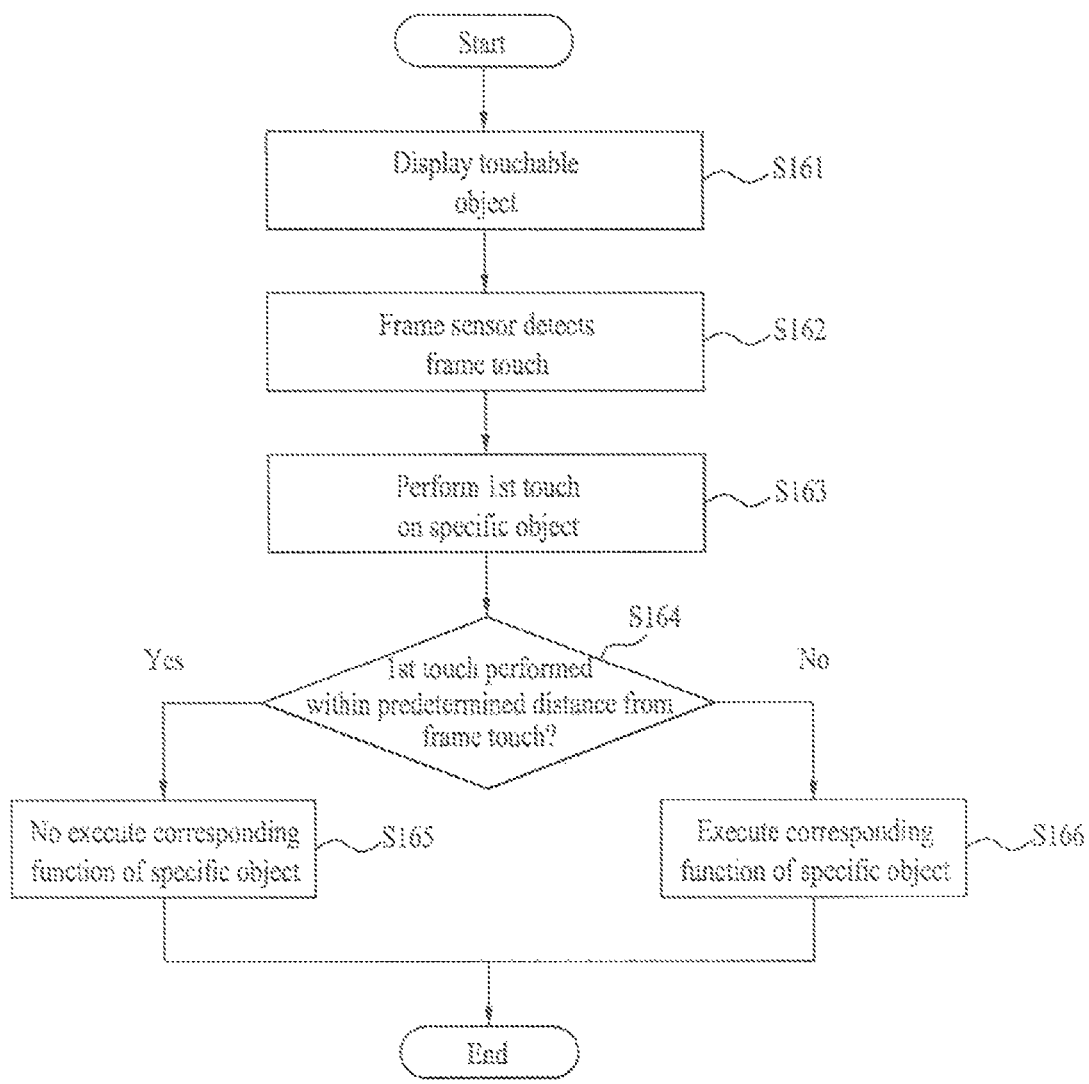
FIG. 16 is a flowchart for a method of controlling a mobile terminal according to an embodiment of the present invention.
Figure 17A:
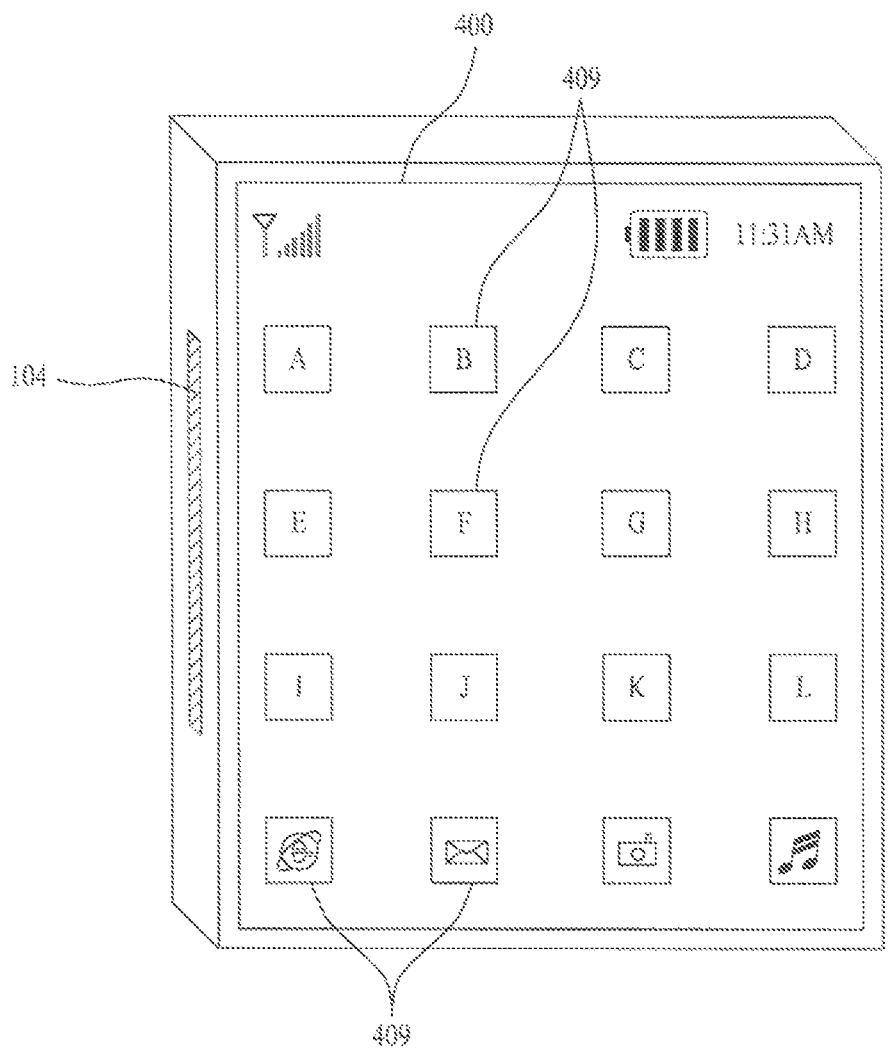
FIG. 17A and FIG. 17B are diagrams of display screen configurations of implementing a method of controlling a mobile terminal according to an embodiment of the present invention.
Figure 17B:
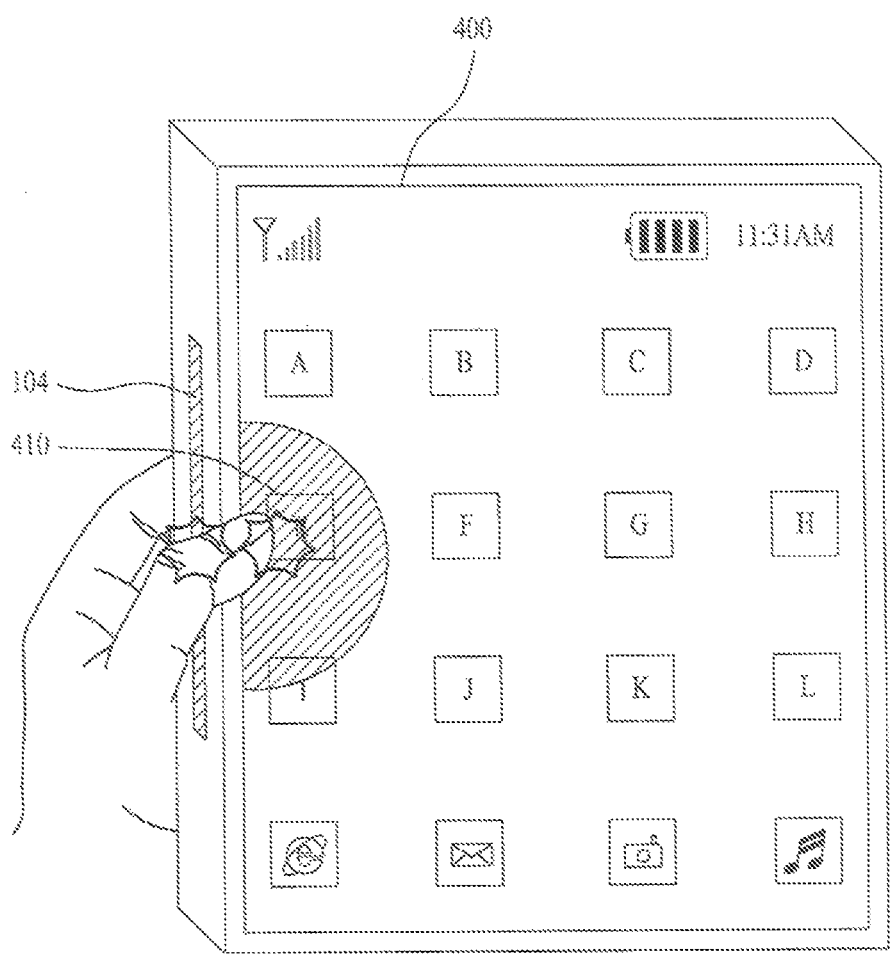

FIG. 16 is a flowchart for a method of controlling a mobile terminal according to an embodiment of the present invention. FIG. 17A and FIG. 17B are diagrams of display screen configurations of implementing a method of controlling a mobile terminal according to an embodiment of the present invention.

Referring to FIG. 17A, a plurality of touch-executable objects 409 are displayed on the touchscreen 400 [S161].

And, a frame sensor 104 can be loaded on the housing of the mobile terminal 100 along a circumference of the touchscreen 400. In this case, the frame sensor 104 is loaded in a manner of completely enclosing the touchscreen 400. Alternatively, the frame sensor 104 can be loaded along the circumference of the touchscreen 400 in part. Moreover, the frame sensor 104 is provided to detect a hand in which the mobile terminal 100 can be held by a terminal user.

FIG. 17A exemplarily shows that the frame sensor 104 is loaded on a lateral side of the housing, by which the present embodiment is non-limited. Alternatively, the frame sensor 104 can be loaded on a frame region 103 on the front side of the housing. Alternatively, the frame sensor 104 can be loaded along a lateral side of a rear side of the housing.

Referring to FIG. 17B, the mobile terminal 100 can be held by a terminal user in his hand.

If so, the controller 180 is able to detect the terminal user's hand brought into contact with a specific position of the frame sensor 104 [S162]. In particular, the controller 180 is able to detect a frame touch to the specific position of the frame sensor 104.

And, the controller 180 is able to detect that a first touch is performed on the specific object 410 by the hand [S163].

If so, the controller 180 determines whether the first-touched specific object 410 is situated in a predetermined distance from the specific position of the frame sensor 104 [S164].

As a result of the determination, if the first-touched specific object 410 is situated in the predetermined distance from the specific position, the controller 180 is able to control a corresponding function of the first-touched specific object 410 not to be executed [S165].

On the contrary, as a result of the determination, if the first-touched specific object 410 is not situated within the predetermined distance from the specific position, the controller 180 is able to control a corresponding function of the first-touched specific object 410 to be executed [S166].

Meanwhile, even if the specific object 410 is situated in the aforesaid fixed edge region of the touchscreen, when a first touch is performed without a frame touch to the fame sensor 104, the controller 180 is able to control the corresponding function of the specific object 410 to be executed.

In particular, the controller 180 is able to variably determine whether to form the edge region on the touchscreen 400 according to a presence or non-presence of the frame touch.

Figure 18:
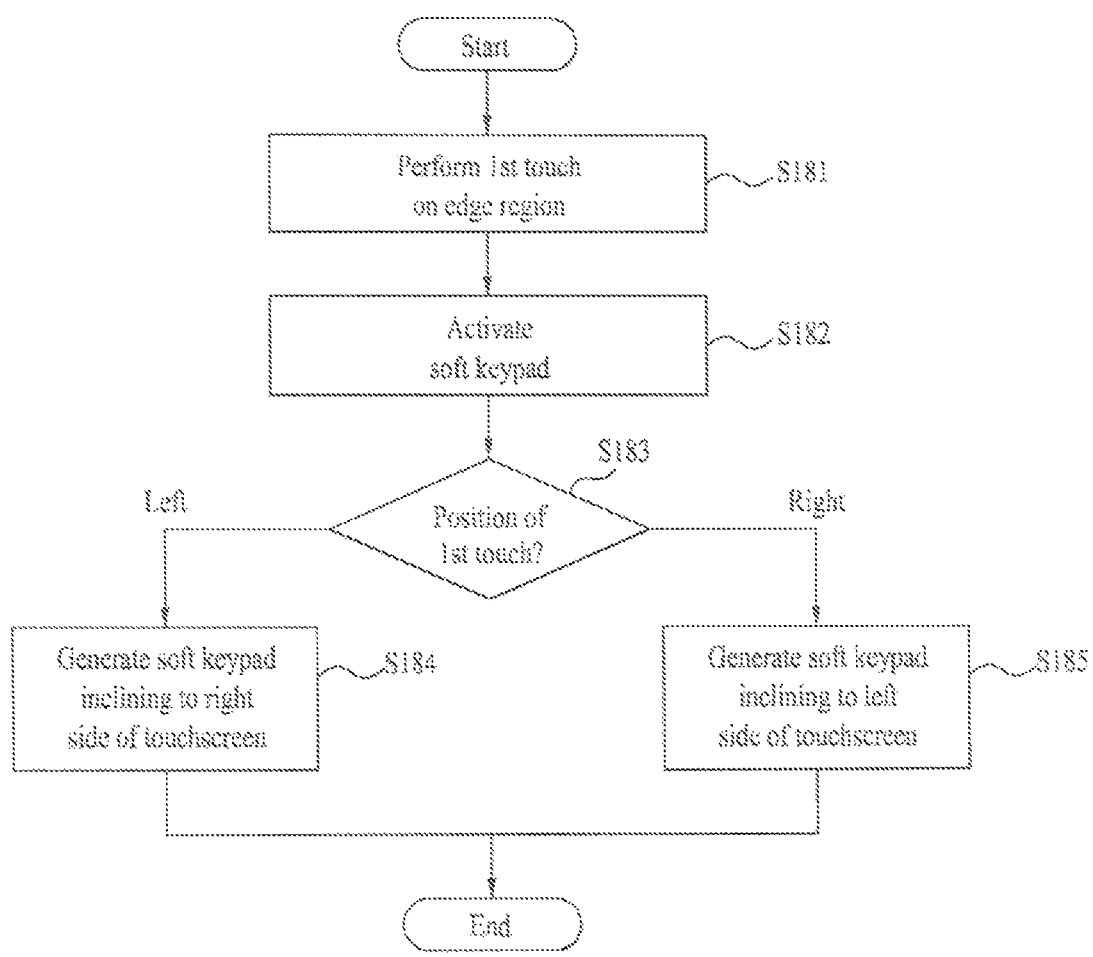
FIG. 18 is a flowchart for a method of controlling a mobile terminal according to an embodiment of the present invention.
Figure 19A:
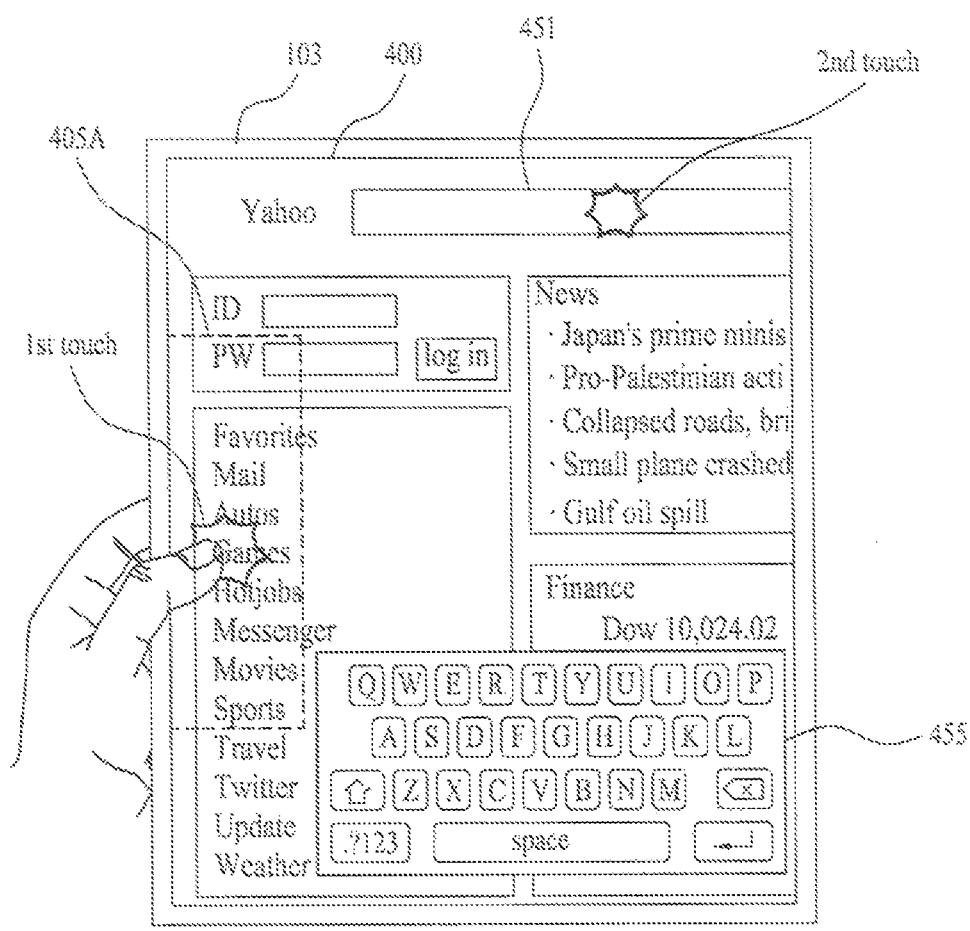
FIG. 19A and FIG. 19B are diagrams of display screen configurations of implementing a method of controlling a mobile terminal according to an embodiment of the present invention.
Figure 19B:
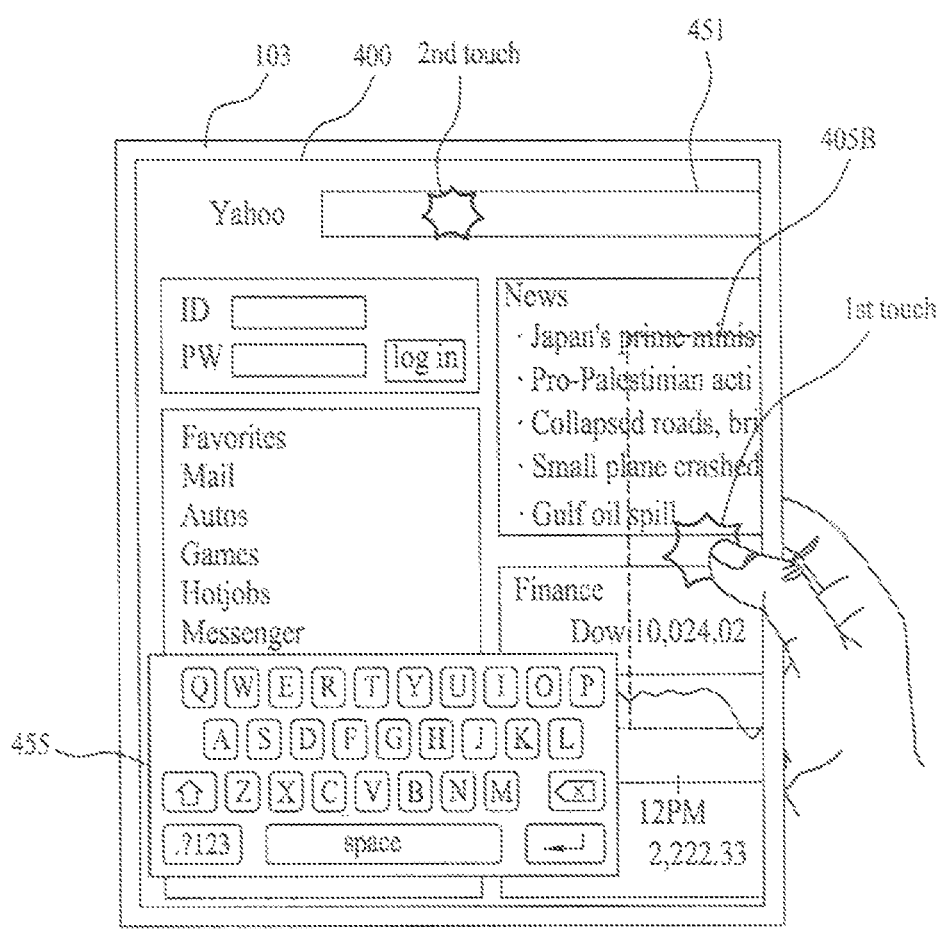

The following description is made with reference to FIG. 18, FIG. 19A and FIG. 19B.

FIG. 18 is a flowchart for a method of controlling a mobile terminal according to an embodiment of the present invention. FIG. 19A and FIG. 19B are diagrams of display screen configurations of implementing a method of controlling a mobile terminal according to an embodiment of the present invention.

Referring to FIG. 18, FIG. 19A and FIG. 19B, a specific application requiring a use of a specific graphic interface (e.g., a soft keypad, etc.) is being executed in the mobile terminal 100. FIG. 19A exemplarily shows that a web browser application for displaying a webpage is being executed in the mobile terminal 100.

The mobile terminal 100 can be held in left hand of a terminal user. Therefore, referring to FIG. 19A, a first touch can be performed on the left edge region 405A of the touchscreen 400 [S181].

While the first touch is being maintained, if a second touch is performed on a text input box 451 of the webpage, the controller 180 is able to activate the soft keypad 455 for inputting a text to the text input box 451 [S182].

In doing so, the controller 180 obtains a position of the first touch [S183].

Referring to FIG. 19A, in case that the first touch is performed on the left edge region 405A, the controller 180 is able to control the activated soft keypad 455 to be generated in a manner of inclining to a right side of the touchscreen 400 [S184].

This facilitates the terminal user to manipulate the soft keypad 455 using a right hand because the terminal user holds the mobile terminal 100 in left hand.

On the contrary, referring to FIG. 19B, the terminal user holds the mobile terminal 100 in right hand. In case that the first touch is performed on the right edge region 405B, the controller 180 is able to control the activated soft keypad 455 to be generated in a manner of inclining to a left side of the touchscreen 400 [S185].

This facilitates the terminal user to manipulate the soft keypad 455 using a left hand because the terminal user holds the mobile terminal 100 in right hand.

In the above description, the generated position of the soft keypad is determined using the first touch position on the touchscreen 400, by which the present embodiment is non-limited. Alternatively, frame sensors are loaded on left and right sides of the housing, respectively. If a frame touch is performed on the left frame sensor, the soft keypad can be generated in a manner of inclining to a right side of the touchscreen. If a frame touch is performed on the right frame sensor, the soft keypad can be generated in a manner of inclining to a left side of the touchscreen.

In the above description, if a first touch is performed on one touch-executable object in the edge region 405, a corresponding function of the touched object may not be executable. Yet, whether to execute the corresponding function of the touched object can be determined according to whether the mobile terminal 100 is connected to a cradle via the interface unit 170. This is explained in detail with reference to FIG. 20 as follows.

Figure 20:
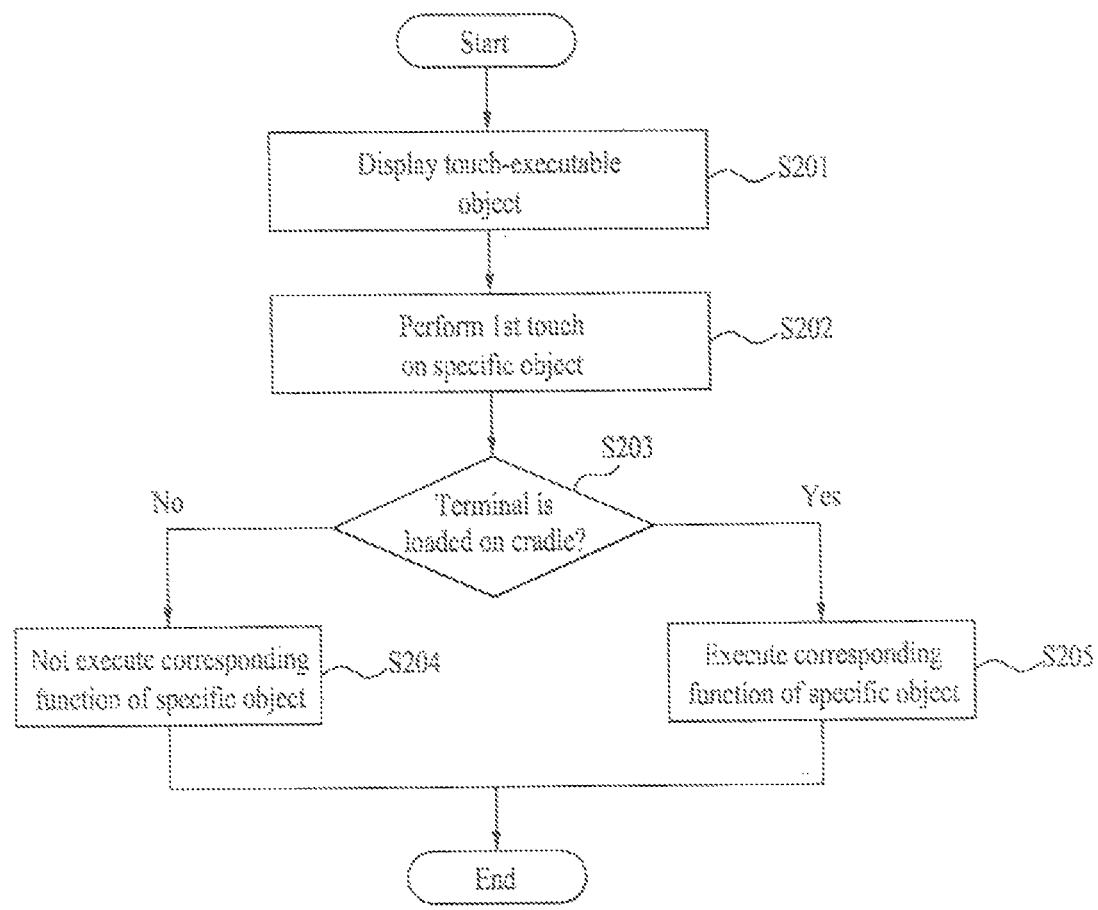
FIG. 20 is a flowchart for a method of controlling a mobile terminal according to an embodiment of the present invention.

FIG. 20 is a flowchart for a method of controlling a mobile terminal according to an embodiment of the present invention.

Referring to FIG. 20, as mentioned in the foregoing description, a plurality of touch-executable objects can be displayed on the touchscreen 400 [S201].

Subsequently, a first touch can be performed on one of the touch-executable objects in the edge region 405 of the touchscreen 400 [S202].

If so, the controller 180 determines whether the mobile terminal 100 is loaded on a cradle via the interface unit 170 [S203].

As a result of the determination, if the mobile terminal 100 is not loaded on the cradle, the controller 180 is able to control a corresponding function of the first-touched object not to be executed [S204].

On the contrary, as a result of the determination, if the mobile terminal 100 is loaded on the cradle, the controller 180 is able to control a corresponding function of the first-touched object to be executed [S205].

Accordingly, the present invention provides the following effects and/or advantages.

First of all, according to at least one of embodiments of the present invention, while a size of a terminal housing is maintained, if a size of the display screen increases, although a frame part of the terminal housing configured to accommodate the display screen becomes thinner than that of the related art, the present invention does not cause inconvenience in holding a mobile terminal in hand.

Secondly, according to at least one of embodiments of the present invention, in case that a display screen includes a touchscreen, even if a terminal user unintentionally touches the touchscreen with a finger to hold a mobile terminal in hand, the present invention prevents malfunction effectively and previously from being caused by the unintentional touch.

It will be apparent to those skilled in the art that various modifications and variations can be specified into other forms without departing from the spirit or scope of the inventions.

In addition, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a housing including a front side, a rear side and a plurality of lateral sides;
a touchscreen located on the front side of the housing, configured to display at least one touch-executable object, and including a predefined edge region; and
a controller,
wherein the controller is configured to preempt execution of a function corresponding to a particular object of the at least one touch-executable object if a first touch of the particular object is detected in the predefined edge region of the touchscreen,
wherein the at least one touch-executable object is displayed by the touchscreen according to an execution of an application, and
wherein the controller is further configured to preempt the execution of the function corresponding to the particular object only if the executed application is of a certain type.

2. The mobile terminal of claim 1, wherein the controller is further configured to grant the execution of the function corresponding to the particular object if a second touch of the particular object is detected concurrent with the detection of the first touch.

3. The mobile terminal of claim 2, wherein the controller is further configured to:
control the touchscreen to display a menu graphic interface related to the function corresponding to the particular object; and
control the touchscreen to maintain the display of the menu graphic interface irrespective of whether the first touch is maintained.

4. The mobile terminal of claim 2, wherein the controller is further configured to control the touchscreen to display a soft keypad having at least a shape or a position dependent on a location of the first touch.

5. The mobile terminal of claim 1, wherein the edge region is located at at least a top edge, a bottom edge, a left edge or a right edge of the touchscreen.

6. The mobile terminal of claim 1, wherein the controller is further configured to:
preempt the execution of the function corresponding to the particular object only if a duration of the first touch is longer than a preset duration; and
grant the execution of the function corresponding to the particular object if the duration of the first touch is shorter than the preset duration.

7. The mobile terminal of claim 1, wherein the controller is further configured to generate at least a sound, a vibration effect or a graphic in order to indicate the preemption of the execution of the function corresponding to the particular object.

8. The mobile terminal of claim 7,
wherein the controller is further configured to generate the graphic in order to indicate the preemption, and
wherein the controller is further configured to control the touchscreen to display the generated graphic at a location of the first touch on the touchscreen.

9. The mobile terminal of claim 1, wherein a header of the executed application indicates the type of the executed application.

10. The mobile terminal of claim 1, further comprising:
a frame sensor located on one of the plurality of lateral sides and adjacent the touchscreen,
wherein the controller is further configured to preempt the execution of the function corresponding to the particular object only if the frame sensor detects a touch by a user within a predetermined distance from a location of the first touch.

11. The mobile terminal of claim 1, wherein the controller is further configured to control the touchscreen to display the particular object at a location away from a location of the first touch.

12. A method of controlling a mobile terminal, the method comprising:
displaying, by a touchscreen, at least one touch-executable object, wherein the touchscreen is located on a front side of a housing of the mobile terminal and includes a predefined edge region;
detecting a first touch of a particular object of the at least one touch-executable object;
preempting execution of a function corresponding to the particular object if the first touch is detected in the predefined edge region of the touchscreen;
displaying, by the touchscreen, the at least one touch-executable object according to an execution of an application; and
preempting the execution of the function corresponding to the particular object only if the executed application is of a certain type.

13. The method of claim 12, further comprising:
detecting a second touch of the particular object concurrent with the detection of the first touch; and
granting the execution of the function corresponding to the particular object upon the detection of the second touch.

14. The method of claim 12, wherein preempting the execution of the function corresponding to the particular object if the first touch is detected in the predefined edge region of the touchscreen comprises:
preempting the execution of the function corresponding to the particular object only if a duration of the first touch is longer than a preset duration; and
granting the execution of the function corresponding to the particular object if the duration of the first touch is shorter than the preset duration.

15. A mobile terminal comprising:
a housing including a front side, a rear side and a plurality of lateral sides;
a touchscreen located on the front side of the housing, configured to display at least one touch-executable object, and including a predefined edge region;

an interface unit configured to mate the mobile terminal with a cradle; and
a controller,
wherein the controller is configured to preempt execution of a function corresponding to a particular object of the at least one touch-executable object if a first touch of the particular object is detected in the predefined edge region of the touchscreen, and
wherein the controller is further configured to grant the execution of the function corresponding to the particular object if the first touch of the particular object is detected in the predefined edge region when the mobile terminal is mated with the cradle.

16. A mobile terminal comprising:
a housing including a front side, a rear side and a plurality of lateral sides;
a touchscreen located on the front side of the housing, configured to display at least one touch-executable object, and including a predefined edge region;
a memory configured to store information; and
a controller,
wherein the controller is configured to preempt execution of a function corresponding to a particular object of the at least one touch-executable object if a first touch of the particular object is detected in the predefined edge region of the touchscreen,
wherein the controller is further configured to generate at least a sound, a vibration effect or a graphic in order to indicate the preemption of the execution of the function corresponding to the particular object,
wherein the controller is further configured to generate the graphic in order to indicate the preemption,
wherein the controller is further configured to control the touchscreen to display the generated graphic at a location of the first touch on the touchscreen, and
wherein the controller is further configured to:
control the memory to store information related to the location of the first touch; and
control the touchscreen to display the generated graphic at a location most frequently touched among locations stored in the memory.

17. A mobile terminal comprising:
a housing including a front side, a rear side and a plurality of lateral sides;
a touchscreen located on the front side of the housing, configured to display at least one touch-executable object, and including a predefined edge region; and
a controller,
wherein the controller is configured to preempt execution of a function corresponding to a particular object of the at least one touch-executable object if a first touch of the particular object is detected in the predefined edge region of the touchscreen,
wherein the controller is further configured to control the touchscreen to display the particular object at a location away from a location of the first touch, and
wherein the controller is further configured to control the touchscreen to shift the display of the particular object toward a center of the touchscreen if the first touch of the particular object is detected in the predefined edge region.

18. The mobile terminal of claim 17,
wherein the at least one touch-executable object is displayed by the touchscreen according to an execution of a web browser application for viewing a webpage,
wherein the particular object corresponds to a link object of the viewed webpage, and
wherein the controller is further configured to control the touchscreen to shift the display of the link object toward the center of the touchscreen and to maintain the display of text surrounding the link object if the first touch of the link object of the viewed webpage is detected in the predefined edge region of the touchscreen.

19. A mobile terminal comprising:
a housing including a front side, a rear side and a plurality of lateral sides;
a touchscreen located on the front side of the housing, configured to display at least one touch-executable object, and including a predefined edge region; and
a controller,
wherein the controller is configured to preempt execution of a function corresponding to a particular object of the at least one touch-executable object if a first touch of the particular object is detected in the predefined edge region of the touchscreen,
wherein the controller is further configured to control the touchscreen to display the particular object at a location away from a location of the first touch,
wherein the touchscreen displays the at least one touch-executable object as a first display, and
wherein the controller is further configured to control the touchscreen to reduce a size of the first display if the first touch of the particular object is detected in the predefined edge region.

* * * * *